(12) United States Patent
Tabata et al.

(10) Patent No.: US 7,901,319 B2
(45) Date of Patent: Mar. 8, 2011

(54) CONTROL DEVICE OF VEHICLE-USE DRIVE DEVICE

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 654 days.

(21) Appl. No.: 11/993,090

(22) PCT Filed: Jun. 22, 2006

(86) PCT No.: PCT/JP2006/312941
§ 371 (c)(1),
(2), (4) Date: Dec. 19, 2007

(87) PCT Pub. No.: WO2006/137586
PCT Pub. Date: Dec. 28, 2006

(65) Prior Publication Data
US 2010/0041511 A1    Feb. 18, 2010

(30) Foreign Application Priority Data

Jun. 22, 2005   (JP) ................. 2005-182399

(51) Int. Cl.
*F16H 3/72* (2006.01)
(52) U.S. Cl. .......................................... 477/3
(58) Field of Classification Search ........... 477/3, 5; 475/2
See application file for complete search history.

(56) References Cited

U.S. PATENT DOCUMENTS

| 5,730,675 | A | * | 3/1998 | Yamaguchi ............ 475/2 |
| 5,775,449 | A | | 7/1998 | Moroto et al. |
| 6,146,302 | A | | 11/2000 | Kashiwase |
| 7,272,987 | B2 | * | 9/2007 | Hughes ............ 74/340 |

FOREIGN PATENT DOCUMENTS

DE    698 35 174 T2    6/2007
JP    7 336810    12/1995

(Continued)

OTHER PUBLICATIONS

Office Action issued Jul. 8, 2010 in German Patent Application No. 112006 001 549.4-51.

*Primary Examiner* — Sherry L Estremsky
*Assistant Examiner* — Edwin A. Young
(74) *Attorney, Agent, or Firm* — Oblon, Spivak, McClelland, Maier & Neustadt, L.L.P.

(57) ABSTRACT

A transmission mechanism including a switching clutch or brake is switchable between a continuously-variable shifting state and a step-variable shifting state, and provides improved fuel economy by a transmission with an electrically variable speed ratio and high power transmitting efficiency by a gear type power transmitting device constructed for mechanical transmission of power. During four-wheel drive vehicle running with second drive wheels driven by a third electric motor, a switching control switches a differential portion to a continuously-variable shifting state, so that an operating speed of a first electric motor operated by an output of an engine as an electric generator is controlled to assure a higher degree of electricity generating efficiency, owing to the differential function of the differential portion, than when the differential portion is placed in a non-continuously-variable shifting state in which first electric motor speed and engine speed are determined by vehicle running speed.

24 Claims, 14 Drawing Sheets

FOREIGN PATENT DOCUMENTS

| | | |
|---|---|---|
| JP | 11 208297 | 8/1999 |
| JP | 11 217025 | 8/1999 |
| JP | 2000 2327 | 1/2000 |
| JP | 2000 346187 | 12/2000 |
| JP | 2001 112101 | 4/2001 |
| JP | 2001 112113 | 4/2001 |
| JP | 2002 78105 | 3/2002 |
| JP | 2003 301731 | 10/2003 |
| JP | 2004 50910 | 2/2004 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD |
| R | | | ○ | | | ○ | 2.393 | 3.977 |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL DEVICE OF VEHICLE-USE DRIVE DEVICE

TECHNICAL FIELD

The present invention relates to a vehicular drive system including a differential mechanism operable to perform a differential function, and electric motors, and more particularly to techniques for reducing the sizes of the electric motors.

BACKGROUND ART

There is known a drive system for a vehicle, which includes a differential mechanism operable to distribute an output of an engine to a first electric motor and its output shaft, and a second electric motor disposed between the output shaft of the differential mechanism and drive wheels of the vehicle. Patent Document 1 discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the vehicular drive system functions as a transmission the speed ratio of which is continuously variable, for example, as an electrically controlled continuously variable transmission, thereby making it possible to drive the vehicle under the control of a control apparatus, with the engine kept in an optimum operating state with an improved fuel economy.

Patent Document 1: JP-2003-301731 A
Patent Document 2: JP-2001-112101 A

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the above-identified Patent Document 1 includes the electric path for transmitting an electric energy from the first electric motor to the second electric motor, namely, a power transmitting path for transmitting a portion of the vehicle drive force as an electric energy, so that the first electric motor is required to be large-sized to meet a need for an increased output of the engine, and the second electric motor driven by the electric energy generated by the first electric motor is also required to be accordingly large-sized, whereby the overall size of the hybrid vehicle drive system tends to be large-sized. It is also noted that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

There is well known a drive system for a so-called "electric four-wheel drive" (electric 4WD) vehicle, which is provided with a plurality of drive devices including a main drive device having an engine as a drive power source for driving one of front and rear wheels, and an auxiliary drive device consisting of only an electric motor provided as a drive power source for driving the other of the front and rear wheels. Patent Document 2 discloses an example of such an electric 4WD vehicle drive system. Although a battery can be temporarily used to supply an electric energy to the electric motor of the auxiliary drive device, an electric energy generated by using an output of an engine is generally supplied to the electric motor of the auxiliary drive device.

In a vehicular drive system which is the above-described hybrid vehicle drive system combined with the auxiliary drive device of the above-described electric 4WD vehicle drive system, too, the electric energy generated by using the output of the engine is generally supplied to the electric motor of the auxiliary drive device. In this vehicular drive system, a first electric motor, for example, is used to generate the electric energy. In this case, the first electric motor not only functions to permit the drive system to operate as an electrically controlled continuously variable transmission, but also functions as an electric generator. If the function of the first electric motor to permit the drive system to operate as the electrically controlled continuously variable transmission is given priority to the function as the electric generator, there is a risk of deterioration of electricity generating efficiency of the first electric motor. The deterioration of the electricity generating efficiency results in reduction of the electric energy amount supplied to the electric motor of the auxiliary drive device, and consequent reduction of deterioration of drivability of the vehicle.

The present invention was made in view of the background art described above. It is therefore an object of this invention to provide a control apparatus for a vehicular drive system including a differential mechanism operable to distribute an output of an engine to a first electric motor and a power transmitting member, and a second electric motor provided in a power transmitting path between the power transmitting member of a vehicle drive wheel, which control apparatus permits size reduction or fuel economy improvement of the vehicular drive system, and which improves electricity generating efficiency of an electric generator.

DISCLOSURE OF THE INVENTION

According the present invention of claim 1, there is provided a control apparatus for (a) a vehicular drive system including a continuously-variable transmission portion which is operable as an electrically controlled continuously variable transmission and which has a differential mechanism operable to distribute an output of an engine to a first electric motor and a power transmitting member, and a second electric motor disposed in a power transmitting path between the power transmitting member and a first drive wheel of a vehicle, the vehicular drive system further including a third electric motor for driving a second drive wheel of the vehicle, the control apparatus being characterized by comprising (b) a differential limiting device provided in the differential mechanism, and operable to limit a differential function of the differential mechanism, for limiting an operation of the continuously-variable transmission portion as the electrically controlled continuously variable transmission, and (c) switching control means operated during running of the vehicle with the second drive wheel driven by the third electric motor, for placing the continuously-variable transmission portion in a continuously-variable transmission portion in a continuously-variable shifting state in which the continuously-variable transmission portion is operable as the electrically controlled continuously variable transmission.

In the vehicular drive system constructed as described above, the continuously-variable transmission portion of the vehicular drive system is switchable by the differential limiting device, between a differential state in which the differential mechanism is operable to perform the differential function without a limitation, that is, a continuously-variable shifting state in which the continuously-variable transmission portion is operable as the electrically controlled continuously variable transmission, and a non-differential state such as a locked state in which the differential mechanism is not operable to perform the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously-variable transmission can be limited, the switching control means is operated during running of the vehicle with the second drive wheel driven by the third electric motor, to switch the continuously-variable transmission portion to the continuously-variable shifting state in which the continuously-variable transmission portion is operable as the electrically controlled continuously variable transmission, so that the operating speed of the first electric motor which is operated by an output of the engine as an electric generator is controlled to assure a higher degree of electricity generating efficiency, owing to the differential function of the differential mechanism, than when the continuously-variable transmission portion is placed in a non-continuously-variable shifting state in which the operating speed of the first electric motor (first electric motor speed) and the operating speed of the engine (engine speed) are determined by vehicle running speed.

For instance, the first electric motor is operated at a speed which permits the first electric motor to generate a sufficient amount of electric energy to be supplied to the third electric motor for driving the second drive wheel, and which assures a maximum electricity generating efficiency of the first electric motor. Accordingly, it is possible to reduce deterioration of drivability of the vehicle during the four-wheel drive running with the second drive wheel driven by the third electric motor.

According to the present invention of claim 2, there is provided a control apparatus for (a) a vehicular drive system including a differential portion which is operable as an electrically controlled differential device and which has a differential mechanism operable to distribute an output of an engine to a first electric motor and a power transmitting member, and a second electric motor disposed in a power transmitting path between the power transmitting member and a first drive wheel of a vehicle, the vehicular drive system further including a third electric motor for driving a second drive wheel of the vehicle, the control apparatus being characterized by comprising (b) a differential limiting device provided in the differential mechanism, and operable to limit a differential function of the differential mechanism, for limiting an operation of the differential portion as the electrically controlled differential device, and (c) switching control means operated during running of the vehicle with the second drive wheel driven by the third electric motor, for placing the differential portion in a differential state in which the differential portion is operable as the electrically controlled differential device.

In the vehicular drive system constructed as described above, the differential portion of the vehicular drive system is switchable by the differential limiting device, between a differential state in which the differential mechanism is operable to perform the differential function without a limitation, that is, a differential state in which the differential portion is operable to perform the differential function, and a non-differential state such as a locked state in which the differential mechanism is not operable to perform the differential function, that is, a non-differential state, for instance, a locked state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the present vehicular drive system including the differential portion the differential function of which can be limited, the switching control means is operated during running of the vehicle with the second drive wheel driven by the third electric motor, to switch the differential portion to the differential state in which the differential portion is operable as the electrically controlled differential device, so that the operating speed of the first electric motor which is operated by an output of the engine as an electric generator is controlled to assure a higher degree of electricity generating efficiency, owing to the differential function of the differential mechanism, than when the differential portion is placed in a non-differential state in which the operating speed of the first electric motor (first electric motor speed) and the operating speed of the engine (engine speed) are determined by vehicle running speed.

For instance, the first electric motor is operated at a speed which permits the first electric motor to generate a sufficient amount of electric energy to be supplied to the third electric motor for driving the second drive wheel, and which assures a maximum electricity generating efficiency of the first electric motor. Accordingly, it is possible to reduce deterioration of drivability of the vehicle during the four-wheel drive running with the second drive wheel driven by the third electric motor.

According to the present invention of claim 3, there is provided a control apparatus for (a) a vehicular drive system including a continuously-variable transmission portion which is operable as an electrically controlled continuously variable transmission and which has a differential mechanism operable to distribute an output of an engine to a first electric motor and a power transmitting member, and a second electric motor disposed in a power transmitting path between the power transmitting member and a drive wheel of a vehicle, the control apparatus being characterized by comprising (b) a differential-state switching device provided in the differential mechanism, and operable to selectively switch the continuously-variable transmission portion between a continuously-variable shifting state in which the continuously-variable transmission portion is operable as an electrically controlled continuously variable transmission, and a non-continuously-variable shifting state in which the continuously-variable transmission portion is not operable as the electrically controlled continuously variable transmission, and (c) electric-motor control means for changing a condition of generation of an electric energy depending upon whether the continuously-variable transmission portion is placed in the continuously-variable shifting state or not.

In the vehicular drive system constructed as described above, the continuously-variable transmission portion of the vehicular drive system is switchable by the differential-sate switching device, between a continuously-variable shifting state in which the continuously-variable transmission portion is operable as the electrically controlled continuously variable transmission, and a non-non-continuously-variable shifting state, for example, a step-variable shifting state which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the present vehicular drive system including the continuously-variable transmission portion switchable between the continuously-variable and step-variable shifting states, the condition of generation of the electric energy is changed by the electric-motor control means depending upon whether the continuously-variable transmission portion is placed in the continuously-variable shifting state or not, so that the amount of electric energy generated can be suitably controlled depending upon the present shifting state of the continuously-variable transmission portion, whereby the electricity generating efficiency of the electric motor is improved.

According to the invention of claim 4, the vehicular drive system further includes a third electric motor for driving a second drive wheel of the vehicle different from the above-indicated drive wheel, and the electric-motor control means changes the condition of generation of an electric energy to be supplied to the third electric motor, during running of the vehicle with the second drive wheel driven by the third electric motor. In this case, it is possible to generate the electric energy to be supplied to the third electric motor for driving the second drive wheel, thereby making it possible to reduce deterioration of the vehicle drivability during electric-4WD running of the vehicle with the second drive wheel driven by the third electric motor.

According to the invention of claim 5, the electric-motor control means changes the condition of generation of the electric energy, by changing an electric generator operated by an output of the engine to generate the electric energy. In this case, the first electric motor or the second electric motor is used as the electric generator depending upon the present shifting state of the continuously-variable transmission portion, so that the required amount of electric energy is generated, with improved electricity generating efficiency of the electric generator.

According to the invention of claim 6, the electric-motor control means operates the first electric motor as an electric generator when the continuously-variable transmission portion is placed in the continuously-variable shifting state. In this case, the operating speed of the first electric motor is controlled to a value assuring a high efficiency of electricity generation, owing to the differential function of the differential mechanism in the continuously-variable shifting state of the continuously-variable transmission portion, making it possible to assure a higher degree of electricity generating efficiency of the first electric motor, than in the non-continuously-variable shifting state of the continuously-variable transmission portion in which the first electric motor speed and the engine speed are determined and influenced by the vehicle speed. Where the vehicular drive system further includes the third electric motor for driving the second drive wheels different from the above-indicated drive wheels, for example, the first electric motor provides an amount of electric energy sufficient to operate the third electric motor for driving the second drive wheels, while at the same time the first electric motor is operated at the speed that assures a maximum efficiency of electricity generation of the first electric motor. Accordingly, it is possible to reduce the deterioration of the vehicle drivability in the electric 4WD running state with the second drive wheels driven by the third electric motor.

According to the invention of claim 7, the electric-motor control means operates the first electric motor and/or the second electric motor as an electric generator when the continuously-variable transmission portion is placed in the non-continuously-variable shifting state. In this case, the first electric motor and/or the second electric motor generates a required amount of electric energy. Where the vehicular drive system further includes the third electric motor for driving the second drive wheels different from the above-indicated drive wheels, for example, the first electric motor and/or the second electric motor provide or provides an amount of electric energy sufficient to operate the third electric motor for driving the second drive wheels, making it possible to reduce the deterioration of the vehicle drivability in the electric 4WD running state with the second drive wheels driven by the third electric motor.

According to the invention of claim 8, there is provided a control apparatus for (a) a vehicular drive system including a differential portion having a differential mechanism operable to distribute an output of an engine to a first electric motor and a power transmitting member, and a second electric motor disposed in a power transmitting path between the power transmitting member and a first drive wheel of a vehicle, the control apparatus being characterized by comprising (b) a differential-state switching device provided in the differential mechanism, and operable to selectively switch the differential portion between a differential state in which the differential portion is operable to perform a differential function, and a non-differential state in which the differential portion is not operable to perform the differential function, and (c) electric-motor control means for changing a condition of generation of an electric energy depending upon whether the differential portion is placed in the differential state or not.

In the vehicular drive system constructed as described above, the differential portion of the vehicular drive system is switchable by the differential-state switching device, between a differential state in which the differential mechanism is operable to perform the differential function, and a non-differential state such as a locked state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the present vehicular drive system including the differential portion switchable between the differential and non-differential states, the condition of generation of the electric energy is changed by the electric-motor control means depending upon whether the differential portion is placed in the differential state or not, so that the amount of electric energy generated can be suitably controlled depending upon the present shifting state of the differential portion, whereby the electricity generating efficiency of the electric motor is improved.

According to the invention of claim 9, the vehicular drive system further includes a third electric motor for driving a second drive wheel of the vehicle different from the above-indicated drive wheel, and the electric-motor control means changes the condition of generation of an electric energy to be supplied to the third electric motor, during running of the vehicle with the second drive wheel driven by said third electric motor. In this case, it is possible to generate the electric energy to be supplied to the third electric motor for driving the second drive wheel, thereby making it possible to reduce deterioration of the vehicle drivability during electric-4WD running of the vehicle with the second drive wheel driven by the third electric motor.

According to the invention of claim 10, the electric-motor control means changes the condition of generation of the electric energy, by changing an electric generator operated by an output of the engine to generate the electric energy. In this case, the first electric motor or the second electric motor is used as the electric generator depending upon the present shifting state of the differential portion, so that the required amount of electric energy is generated, with improved electricity generating efficiency of the electric generator.

According to the invention of claim 11, the electric-motor control means operates the first electric motor as an electric generator when the differential portion is placed in differential state. In this case, the operating speed of the first electric motor is controlled to a value assuring a high efficiency of electricity generation, owing to the differential function of the differential mechanism in the differential state of the differential portion, making it possible to assure a higher degree of electricity generating efficiency of the first electric motor, than in the non-differential state of the differential portion in which the first electric motor speed and the engine speed are determined and influenced by the vehicle speed. Where the vehicular drive system further includes the third electric motor for driving the second drive wheels different from the above-indicated drive wheels, for example, the first electric motor provides an amount of electric energy sufficient to operate the third electric motor for driving the second drive wheels, while at the same time the first electric motor is operated at the speed that assures a maximum efficiency of electricity generation of the first electric motor. Accordingly, it is possible to reduce the deterioration of the vehicle drivability in the electric 4WD running state with the second drive wheels driven by the third electric motor.

According to the invention of claim 12, the electric-motor control means operates the first electric motor and/or the second electric motor as an electric generator when the differential portion is placed in the differential state. In this case, the first electric motor and/or the second electric motor generates a required amount of electric energy. Where the vehicular drive system further includes the third electric motor for driving the second drive wheels different from the above-indicated drive wheels, for example, the first electric motor and/or the second electric motor provide or provides an amount of electric energy sufficient to operate the third electric motor for driving the second drive wheels, making it possible to reduce the deterioration of the vehicle drivability in the electric 4WD running state with the second drive wheels driven by the third electric motor.

According to the invention of claim 13, the vehicular drive system further includes an electric-energy storage device capable of supplying an electric energy, and the electric-motor control means is configured to supply the electric energy from the electric-energy storage device when the first electric motor and the second electric motor cannot be used as the electric generator. In this case, the electric-energy storage device provides the required amount of electric energy. Where the vehicular drive system includes a third electric motor operable to drive a second drive wheel of the vehicle different from the above-indicated drive wheel, for example, the electric-energy storage device supplies the electric energy to the third electric motor for driving the second drive wheel, making it possible to reduce deterioration of the vehicle drivability in the electric 4WD running with the second drive wheel driven by the third electric motor.

According to the present invention of claim 14, there is provided a control apparatus for (a) a vehicular drive system including a differential portion having a differential mechanism operable to distribute an output of an engine to a first electric motor and a power transmitting member, the vehicle drive system further including an auxiliary electric motor disposed in a power transmitting path between the power transmitting member and a drive wheel of a vehicle, the control apparatus being characterized by comprising (b) switching control means operated during running of the vehicle with an operation of the auxiliary electric motor, for placing the differential mechanism in a continuously-variable shifting state in which the differential mechanism is operable as an electrically controlled continuously variable transmission, and (c) a differential limiting device provided in the differential mechanism, and operable to limit a differential function of the differential mechanism, for limiting an operation of the differential mechanism as an electrically controlled continuously variable transmission.

In the vehicular drive system constructed as described above, the differential portion of the vehicular drive system is switchable by the switching control means and the differential-state switching device, between the differential state in which the differential mechanism is operable to perform the differential function, and the non-differential state such as a locked state in which the differential portion is not operable to perform the differential function. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

According to the invention of claim 16, the electric-motor control means changes the condition of generation of an electric energy to be supplied to the auxiliary electric motor during the running of the vehicle with the drive wheel driven by the auxiliary electric motor. In this case, it is possible to generate the electric energy to be supplied to the auxiliary electric motor for driving the drive wheel, thereby making it possible to reduce deterioration of the vehicle drivability during running of the vehicle with the drive wheel driven by the auxiliary electric motor.

According to the invention of claim 17, the electric-motor control means changes the condition of generation of the electric energy, by changing an electric generator operated by an output of the engine to generate the electric energy. In this case, the first electric motor or the second electric motor is used as the electric generator depending upon the present shifting state of the differential portion, so that the required amount of electric energy is generated, with improved electricity generating efficiency of the electric generator.

According to the invention of claim 18, the electric-motor control means operates the first electric motor as an electric generator when the differential mechanism is placed in a differential state. In this case, the operating speed of the first electric motor is controlled to a value assuring a high efficiency of electricity generation, owing to the differential function of the differential mechanism in the differential state, making it possible to assure a higher degree of electricity generating efficiency of the first electric motor, than in the non-differential state of the differential portion in which the first electric motor speed and the engine speed are determined and influenced by the vehicle speed. The first electric motor provides an amount of electric energy sufficient to operate the auxiliary electric motor for driving the drive wheel, while at the same time the first electric motor is operated at the speed that assures a maximum efficiency of electricity generation of the first electric motor. Accordingly, it is possible to reduce the deterioration of the vehicle drivability during running of the vehicle with the drive wheel driven by the auxiliary electric motor.

According to the invention of claim 19, the electric-motor control means operates the first electric motor and/or the second electric motor as an electric generator when the differential mechanism is placed in a non-differential state. In this case, the first electric motor provides a sufficient amount of electric energy to be supplied to the auxiliary electric motor for driving the drive wheel, making it possible to reduce the deterioration of the vehicle drivability during running of the vehicle with the drive wheel driven by the auxiliary electric motor.

According to the invention of claim 20, the vehicular drive system further includes an electric-energy storage device capable of supplying an electric energy, and wherein the electric-motor control means is configured to supply the electric energy from the electric-energy storage device when the first electric motor and the second electric motor cannot be used as the electric generator. In this case, the electric-energy storage device provides the required amount of electric energy. For example, the electric-energy storage device supplies the electric energy to the auxiliary electric motor for driving the drive wheel, making it possible to reduce deterioration of the vehicle drivability during running of the vehicle with the drive wheel driven by the auxiliary electric motor.

Preferably, the differential limiting device or the differential-state switching device is configured to place the differential mechanism in a differential state in which the differential mechanism performs the differential function, for thereby placing the continuously-variable transmission portion in a continuously-variable shifting state in which the continuously-variable transmission portion is operable as the electrically controlled continuously variable transmission, and to place the differential mechanism in a non-differential state (for example, a locked state) in which the differential mechanism does not perform the differential function, for thereby placing the continuously-variable transmission portion in a non-continuously-variable shifting state (for example, a step-variable shifting state) in which the continuously-variable transmission portion is not operable as the electrically controlled continuously variable transmission. In this case, the continuously-variable transmission portion is switchable between the continuously-variable shifting state and the non-continuously-variable shifting state.

Preferably, the differential limiting device or the differential-state switching device is configured to place the differential mechanism in a differential state in which the differential mechanism performs the differential function, for thereby placing the differential portion in a differential state in which the differential portion performs the differential function, and to place the differential mechanism in a non-differential state (for example, a locked state) in which the differential mechanism does not perform the differential function, for thereby placing the differential portion in a non-differential state (for example, a locked state) in which the differential portion does not perform the differential function. In this case, the differential portion is switchable between the differential state and the non-differential state.

Preferably, the differential mechanism has a first element connected to the engine, a second element connected to the first electric motor and a third element connected to the power transmitting member, and the differential limiting device or the differential-state switching device is operable to place the differential mechanism in a differential state in which the first, second and third elements of the differential mechanism are rotatable relative to each other, and to place the differential mechanism in a non-differential state (for example, locked state) in which at least the second and third elements are not rotatable at respective different speeds. For example, the second and third elements are rotatable at respective different speeds in the differential state of the differential mechanism, and the first, second and third elements are rotated as a unit or the second element is held stationary in the non-differential or locked state of the differential mechanism. Thus, the differential mechanism is switchable between the differential and non-differential states.

Preferably, the differential limiting device or the differential-state switching device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which at least the second and third elements are rotatable at respective different speeds, and in which the differential mechanism is operable as an electrically controlled differential device. In this case, the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

Preferably, the differential mechanism is a planetary gear set, and the first element is a carrier of the planetary gear set, and the second element is a sun gear of the planetary gear set, while the third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, the vehicular drive system further includes a transmission portion disposed in a power transmitting path between the power transmitting member and the drive wheel. In this case, an overall speed ratio of the vehicular drive system is defined by a speed ratio of the continuously-variable transmission portion and a speed ratio of the transmission portion, so that the vehicle drive force can be obtained over a relatively wide range of the overall speed ratio, by utilizing the speed ratio of the transmission portion, whereby the efficiency of the continuously-variable shifting control of the continuously-variable transmission portion is further improved. Where the transmission portion is a speed-reducing transmission having a speed ratio higher than 1, the output torque of the second electric motor may be smaller than the torque of the output shaft of the transmission portion, so that the required size of the second electric motor can be reduced. The continuously-variable transmission portion placed in its continuously-variable shifting state and the transmission portion cooperate to constitute a continuously-variable transmission, while the continuously-variable transmission portion placed in the non-continuously-variable shifting state and the transmission portion cooperate to constitute a step-variable transmission.

Preferably, the vehicular drive system further includes a transmission portion disposed in a power transmitting path between the power transmitting member and the drive wheel. In this case, an overall speed ratio of the vehicular drive system is defined by a speed ratio of the differential portion and a speed ratio of the transmission portion, so that the vehicle drive force can be obtained over a relatively wide range of the overall speed ratio, by utilizing the speed ratio of the transmission portion. Where the transmission portion is a speed-reducing transmission having a speed ratio higher than 1, the output torque of the second electric motor may be smaller than the torque of the output shaft of the transmission portion, so that the required size of the second electric motor can be reduced. The differential portion placed in its differential state and the transmission portion cooperate to constitute a continuously-variable transmission, while the differential portion placed in its non-differential state and the transmission portion cooperate to constitute a step-variable transmission.

Preferably, the transmission portion is a step-variable automatic transmission. In this case, the overall speed ratio of the vehicular drive system is changed in steps when the transmission portion is shifted. The change of the overall speed ratio in steps is more rapid than when the overall speed ratio is continuously changed. Accordingly, the drive system functions as a continuously variable transmission capable of smoothly changing the vehicle drive torque, and also capable of changing the speed ratio in steps for rapidly obtaining the vehicle drive torque.

EXPLANATION OF REFERENCE SIGNS

8: Engine
10, 70: Transmission mechanism (Drive system)
11: Differential portion (Continuously-variable transmission portion)
16: Power distributing mechanism (Differential mechanism)
18: Power transmitting member
34: Drive wheels
39: Second drive wheels
40: Electronic control device (Control device)
50: Switching control means
52: Hybrid control means (Electric-motor control means)
M1: First electric motor
M2: Second electric motor
M3: Third electric motor
C0: Switching clutch (Differential limiting device, Differential-state switching device)
B0: Switching brake (Differential limiting device, Differential-state switching device)

BEST MODE FOR CARRYING OUT THE INVENTION

The embodiments of this invention will be described in detail by reference to the drawings.

Embodiment 1

Figures 1, 2:
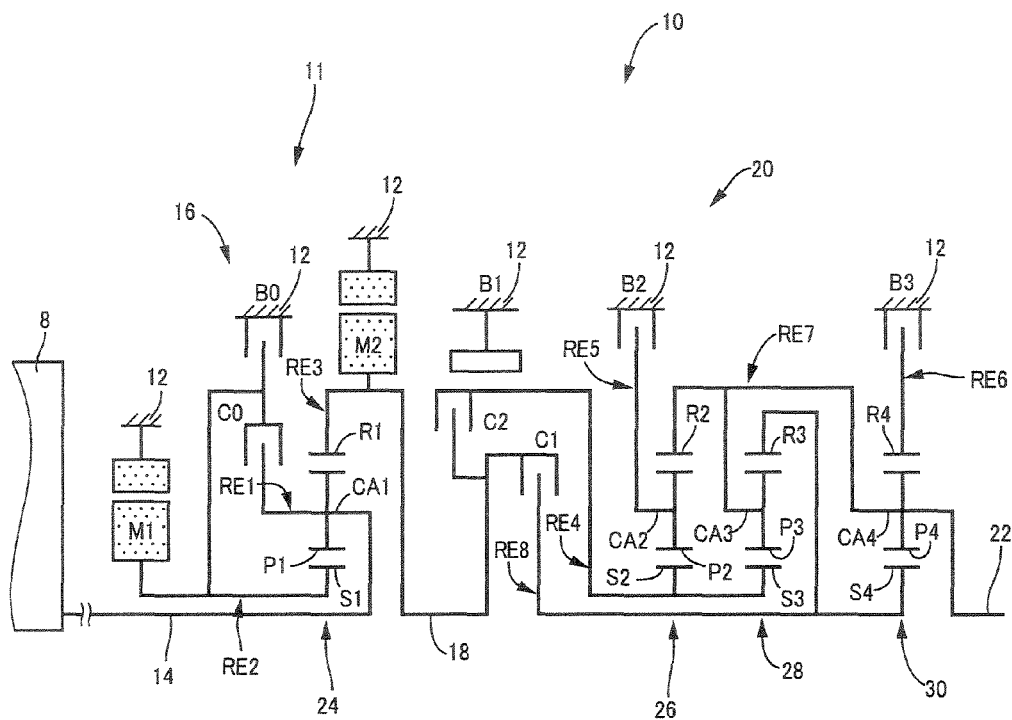
FIG. 1 is a schematic view for explaining an arrangement of a drive system of a hybrid vehicle according to one embodiment of the present invention.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 6:
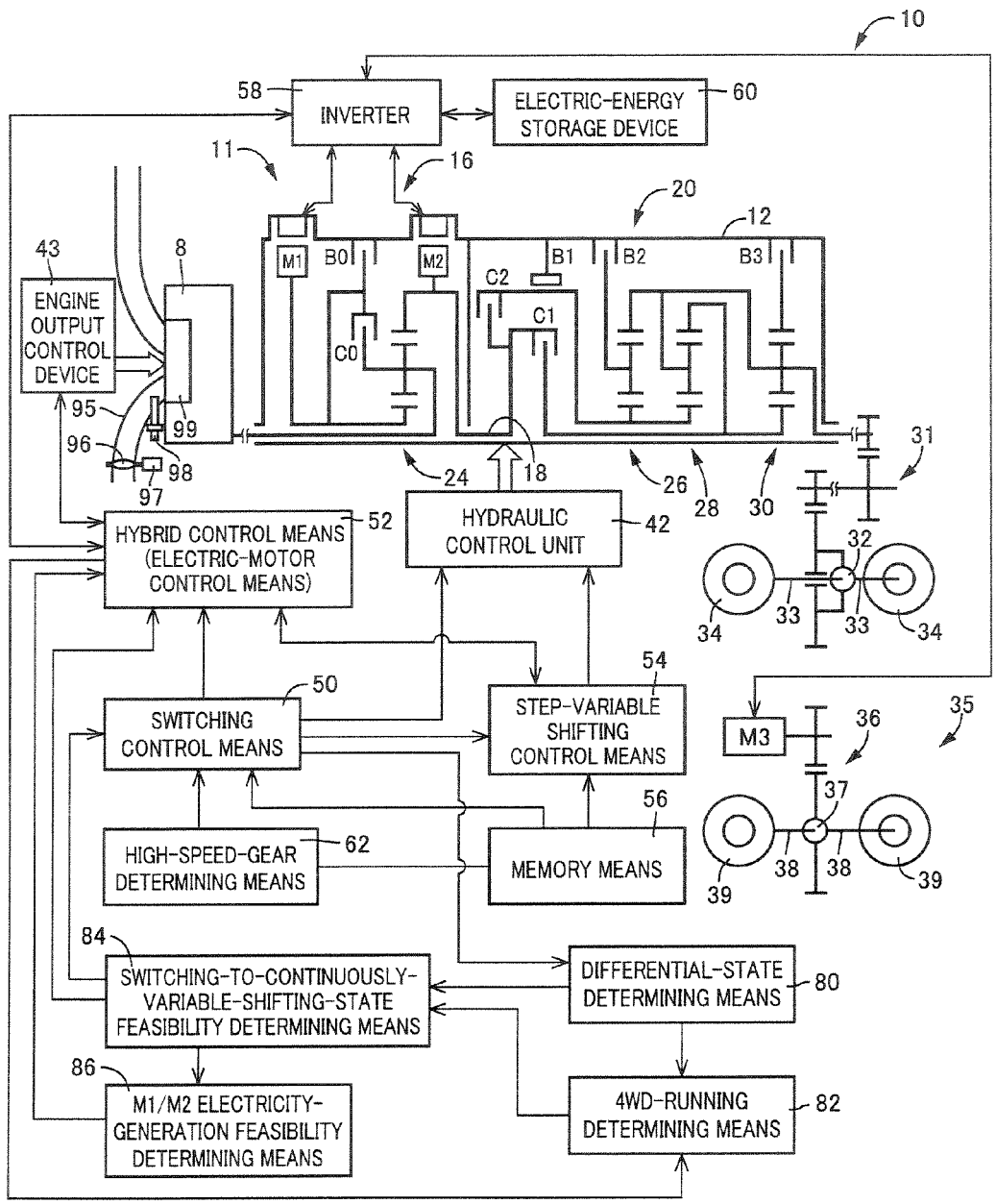
FIG. 6 is a functional block diagram illustrating major control functions of the electronic control device of FIG. 4.

FIG. 1 is s schematic view for explaining an a transmission mechanism 10 constituting a part of a drive system for a hybrid vehicle, which drive system is controlled by a control apparatus according to one embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a transmission portion in the form of an automatic transmission portion 20, which functions as a multiple-step transmission disposed between the differential portion 11 and drive wheels 34 of the vehicle, and which is connected in series via a power transmitting member 18 (power transmitting shaft) to the transmission portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used as a main drive device for a front-and-rear drive vehicle in the form of a four-wheel-drive (4WD) vehicle, and is disposed between a drive power source in the form of an internal combustion engine 8 and the pair of drive wheels 34, to transmit a vehicle drive force from the engine 8 to the pair of drive wheels 34 through a speed reducing device 31, a differential gear device 32 and a pair of drive axles 33, as shown in FIG. 6. The engine 8 may be a gasoline engine or diesel engine and functions as a vehicle drive power source directly connected to the input shaft 14 or indirectly via the pulsation absorbing damper.

In the present transmission mechanism 10 described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in the schematic view of FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 34. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In this power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, so that the differential portion 11 is placed in the continuously-variable shifting state (electrically established CVT state), in which the rotating speed of the power transmitting member 18 is continuously variable, irrespective of the rotating speed of the engine 8, namely, placed in the differential state in which a speed ratio γ0 (rotating speed $N_{14}$ of the input shaft 14/rotating speed $N_{18}$ of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the connected or locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 (hereinafter referred to as "transmitting-member speed $N_{18}$") are made equal to each other, so that the differential portion 11 (power distributing mechanism 16) is placed in a non-continuously-variable shifting state, for example, in a fixed-speed-ratio shifting state or step-variable shifting state in which the mechanism 16 functions as a transmission having a fixed speed ratio γ0 equal to 1.

When the switching brake B0 is engaged in place of the switching clutch C0, the first sun gear S1 is fixed to the casing 12, so that the power distributing mechanism 16 is placed in the connected or locked state in which the first sun gear S1 is not rotatable, namely, placed in a non-differential state in which the differential function is not available, so that the differential portion 11 is also placed in the non-differential state. Since the rotating speed of the first ring gear R1 is made higher than that of the first carrier CA1, the differential portion 11 is placed in the non-continuously-variable shifting state, for example, in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state, namely, non-locked state (nonconnected state) and the non-differential state, namely, locked state (connected state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

Considered from another point of view, the switching clutch C0 and switching brake B0 function as a differential limiting device operable to limit the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the differential portion 11 (power transmitting member 18) are selectively connected to each other through the first clutch C1 or the second clutch C2, which is provided to shift the automatic transmission portion 20. Considered from another point of view, the first clutch C1 and the second clutch C2 function as coupling devices operable to place a power transmitting path between the differential portion 11 and the automatic transmission portion 20, in other words, a power transmitting path between the differential portion 11 and the drive wheels 34, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the non-continuously-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. The differential portion 11 can also be said to be a transmission which is selectively placed in one of its step-variable and continuously-variable shifting states.

Described in detail, when the transmission mechanism 10 is placed in its step-variable shifting state with the differential portion 11 placed in its step-variable shifting state with one of the switching clutch C0 and switching brake 130 held in the engaged state, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The two frictional coupling devices may consist of a frictional coupling device to be released (hereinafter referred to as "released-side coupling device"), and a frictional coupling device to be engaged (hereinafter referred to as "engaged-side coupling device"). The above-indicated positions have respective speed ratios γT (input shaft speed $N_{IN}$/output shaft speed $N_{OUT}$) which change as geometric series. The speed ratios γT are overall speed ratios of the transmission mechanism 10 determined by a speed ratio γ0 of the differential portion 11 and a speed ratio γ of the automatic transmission portion 20.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M (hereinafter referred to as an input speed $N_{IN}$ of the automatic transmission portion 20), namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

Figure 3:
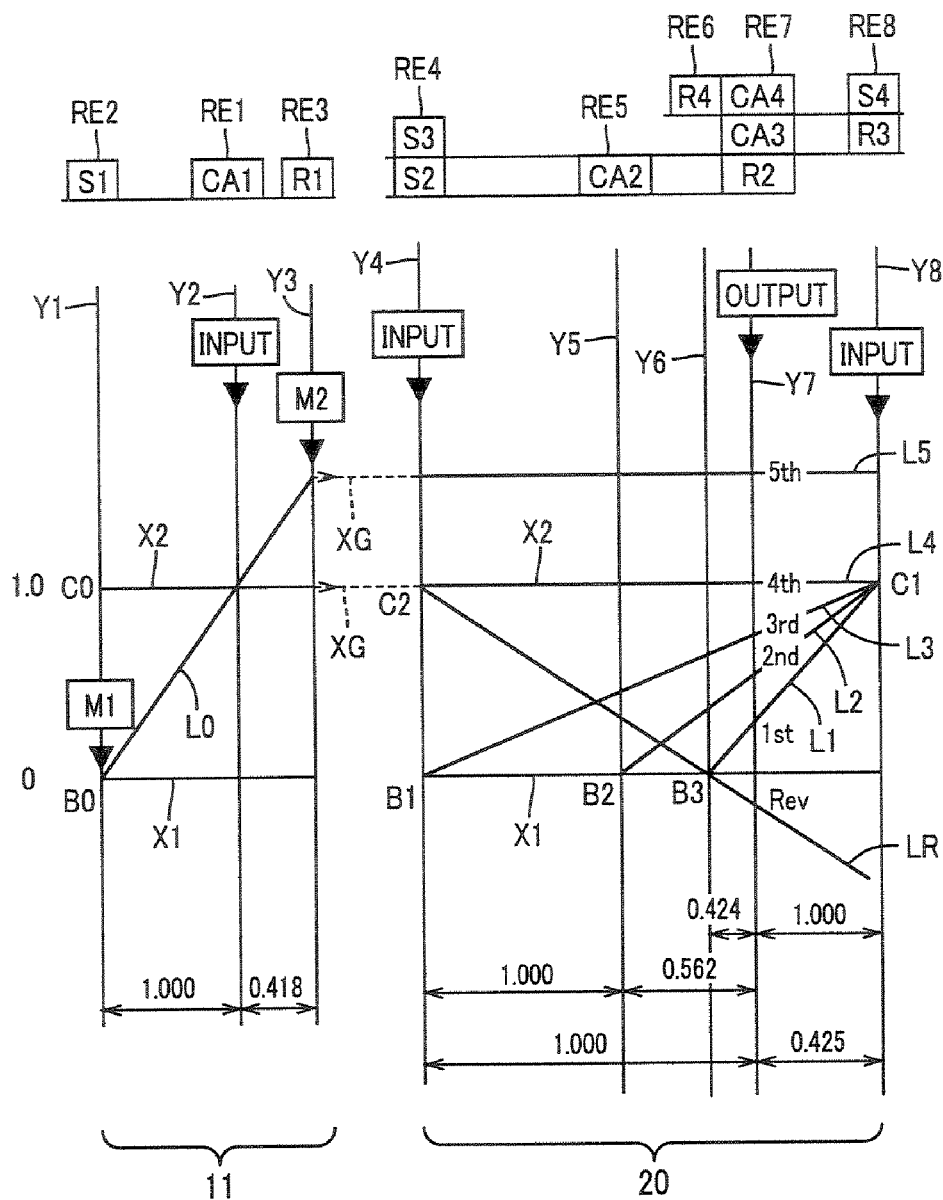
FIG. 3 is a collinear chart indicating relative rotating speeds of the hybrid vehicle drive system of FIG. 1 operated in the step-variable shifting state, in different gear positions of the drive system.

For example, the input speed $N_{IN}$ of the automatic transmission portion 20 placed in one of the first through fourth gear positions (or the fifth gear position established by the engaging actions of the same frictional coupling devices C1, C2 as used to establish the fourth gear position) is continuously variable in the released state of both of the switching clutch C0 and switching brake B0, as indicated in the table of FIG. 2, while the transmission mechanism 10 functions as the continuously variable transmission, so that the overall speed ratio γT of the transmission mechanism 10 is continuously variable across the adjacent gear positions FIG. 3 is a collinear chart which indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the transmission portion (step-variable shifting portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios $\rho 2$, $\rho 3$ and $\rho 4$ of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio $\rho$. In the differential portion 11, the distance between the vertical lines Y1 and Y2 corresponds to "1", while the distance between the vertical lines Y2 and Y3 corresponds to the gear ratio $\rho$. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio $\rho$.

Described by reference to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the first through third rotary elements RE1-RE3 are rotatable relative to each other, for example, at least the second rotary element RE2 and the third rotary element RE3 are rotatable relative to each other. In this case, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2, that is, the engine speed $N_E$ is raised or lowered, if the rotating speed of the first ring gear R1 determined by the vehicle speed V and represented by a point of intersection between the straight line L0 and the vertical line Y3 is substantially held constant.

When the switching clutch C0 is engaged, the first sun gear S1 and the first carrier CA1 are connected to each other, and the power distributing mechanism 16 is placed in the first non-differential state in which the above-indicated three rotary elements RE1, RE2, RE3 are rotated as a unit and the relative rotation of the second and third rotary elements RE2, RE3 is prevented, so that the straight line L0 is aligned with the horizontal line X2, so that the power transmitting member 18 is rotated at a speed equal to the engine speed $N_E$. When the switching brake B0 is engaged, on the other hand, the first sun gear S1 is fixed to the casing 12, and the power distributing mechanism 16 is placed in the second non-differential state in which the second rotary element RE2 is stopped and the relative rotation of the second and third rotary elements RE2, RE3 is prevented, so that the straight line L0 is inclined in the state indicated in FIG. 3, whereby the differential portion 11 functions as a speed increasing mechanism. Accordingly, the rotating speed of the first ring gear R1 represented by a point of intersection between the straight lines L0 and Y3, that is, the transmitting-member speed $N_{18}$ is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
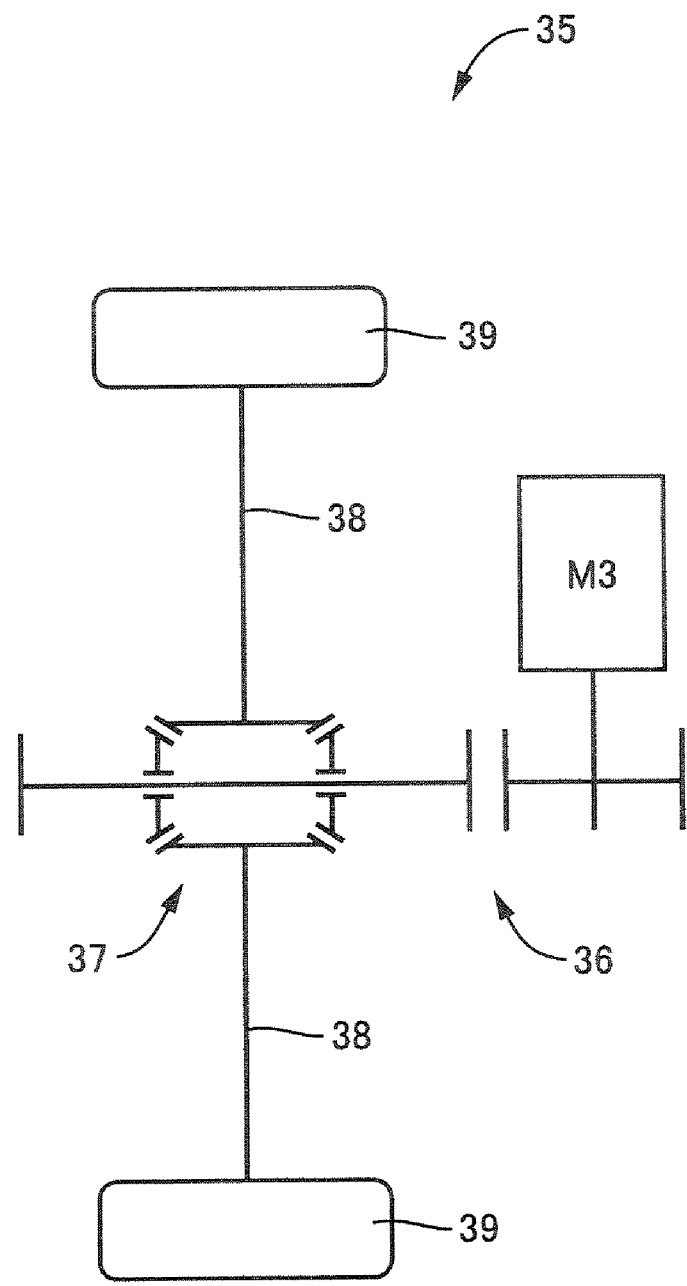
FIG. 4 is a schematic view for explaining an auxiliary drive device which is suitably used for a 4WD vehicle, in addition to a transmission mechanism, and which constitutes a part of the hybrid vehicle drive system.

Referring to the schematic view of FIG. 4, there will be described an auxiliary drive device 35 which is provided in addition to the transmission mechanism 10 and which constitutes a part of the hybrid vehicle drive system. This auxiliary drive device 35, which is suitably used as a drive for a four-wheel drive vehicle, includes a drive power source in the form of a third electric motor M3 an output of which is transmitted through a speed reducing device 36, a differential gear device 37 and a pair of drive axles 38, to a pair of rear drive wheels in the form of second drive wheels 39 provided in addition to the above-described drive wheels 34. Thus, the present hybrid vehicle drive system is an electric 4WD (e-4WD) drive system in which the first drive wheels in the form of the front drive wheels 34 are driven primarily by the engine 8 through the transmission mechanism 10, while the second or rear drive wheels 39 provided in addition to the drive wheels 34 are driven primarily by the third electric motor M3.

Figure 5:
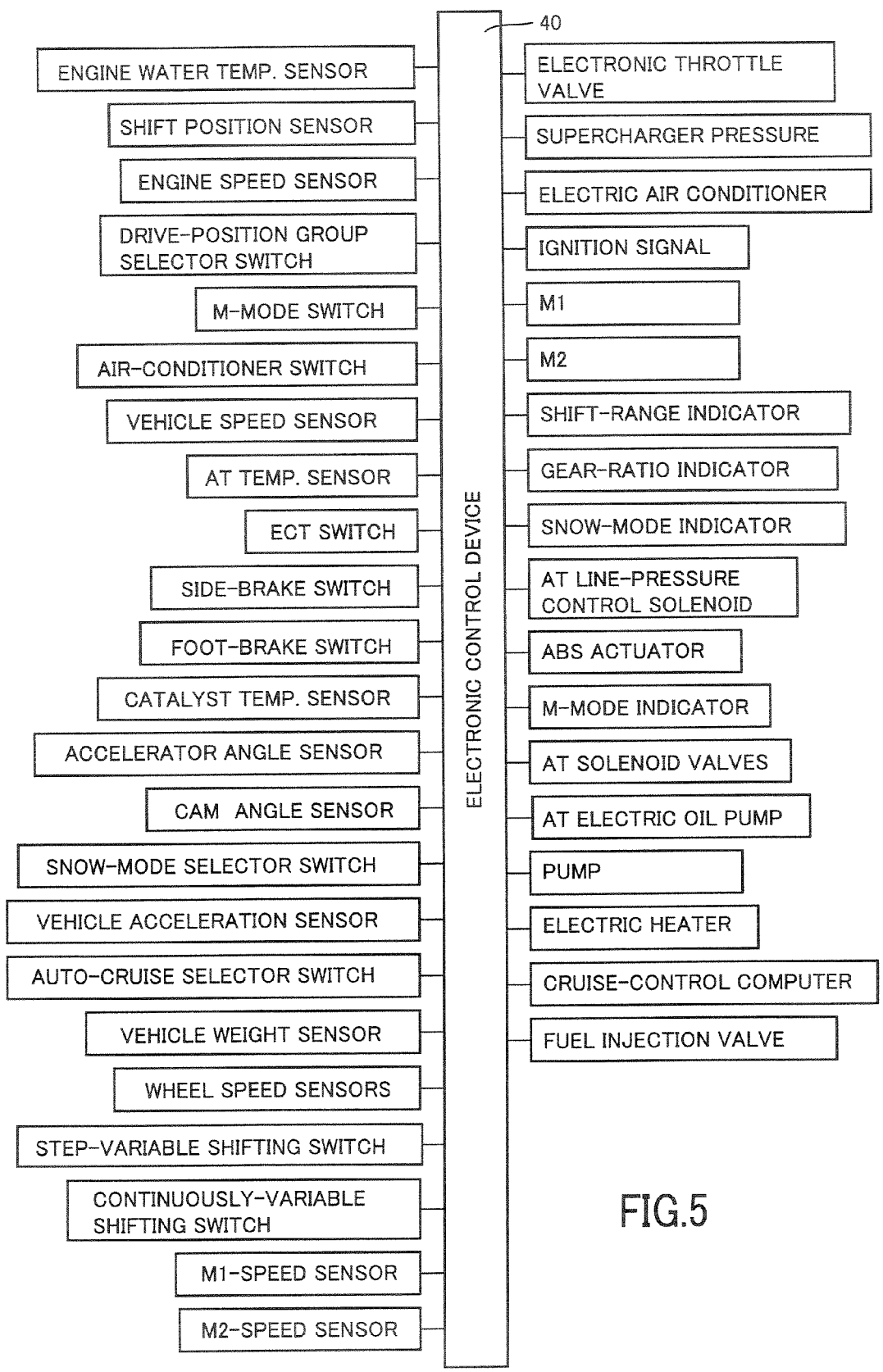
FIG. 5 is a view indicating input and output signals of an electronic control device provided in the drive system of the embodiment of FIG. 1.

FIG. 5 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 5, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature $T_{OIL}$ of a working oil of the automatic transmission portion 20; a signal indicative of an operated state of a side brake; a signal indicative of an operated state of a foot brake; a signal indicative of a temperature of a catalyst; a signal indicative of an amount of operation in the form of an angle of operation $A_{CC}$ of an accelerator pedal, which represents a vehicle output required by a vehicle operator; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$); a signal indicative of a rotating speed $N_{M2}$ of the second electric motor M2 (hereinafter referred to as "second electric motor speed $N_{M2}$); a signal indicative of a rotating speed $N_{M3}$ of the third electric motor M3 (hereinafter referred to as "third electric motor speed $N_{M3}$); and a signal indicative of an amount of electric energy SOS stored in (a charging state of) an electric-energy storage device 60 (shown in FIG. 6).

The electronic control device 40 is further arranged to generate various signals such as: control signals to be applied to an engine output control device 43 (shown in FIG. 6) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 6) provided to control the hydraulic actuators of the hydraulically operated frictional coupling devices of the differential portion 11 and automatic transmission portion 20; a signal to drive an electrically operated oil pump used as a hydraulic pressure source for the hydraulic control unit 42; a signal to drive an electric heater; and a signal to be applied to a cruise-control computer.

FIG. 6 is a functional block diagram for explaining major control functions of the electronic control device 40. Step-variable shifting control means (step-variable shifting control portion) 54 shown in FIG. 6 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control relation or map) which is stored in memory means (memory portion) 56 and which represents shift-up boundary lines indicated by solid lines in FIG. 7 and shift-down boundary lines indicated by one-dot chain lines in FIG. 7. The step-variable shifting control means 54 generates commands (shifting commands or hydraulic control command) to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. Described in detail, the step-variable shifting control means 54 commands the hydraulic control unit 42 to release the released-side coupling device and engage the engaged-side coupling device, for effecting the clutch-to-clutch shifting action of the automatic transmission portion 20. According to the generated commands, the hydraulic control unit 42 activates the appropriate solenoid-operated valves incorporated in the hydraulic control units 42, to activate the hydraulic actuators of the released-side and engaged-side coupling devices for effecting the clutch-to-clutch shifting action of the automatic transmission portion 20.

Hybrid control means (Hybrid control portion) 52 functioning as continuously-variable shifting control means or a continuously-variable shifting control portion is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the angle of operation $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

Figure 8:
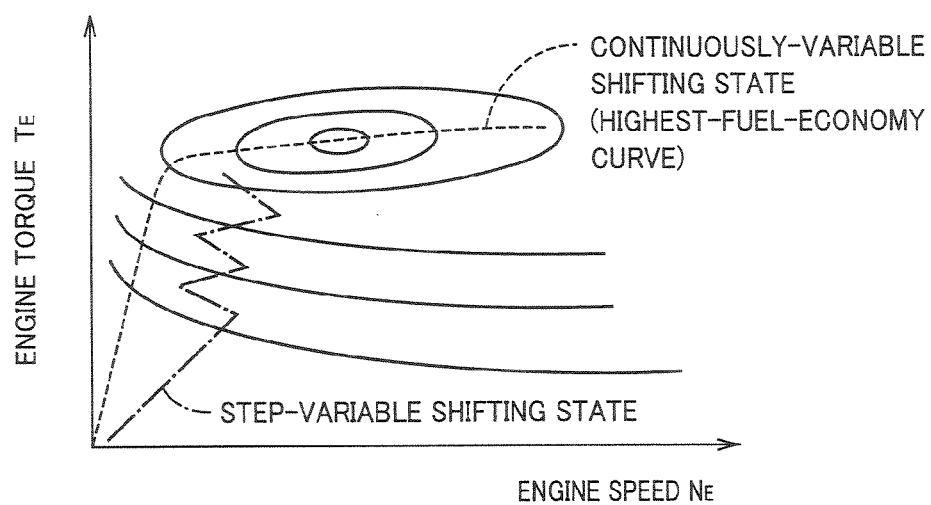
FIG. 8 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the transmitting-member speed $N_{18}$ determined by the vehicle speed V and the selected gear position of the transmission portion 20. That is, the hybrid control means 52 determines a target value of the overall speed ratio γT of the transmission mechanism 10, so that the engine 8 is operated according to a stored highest-fuel-economy curve (fuel-economy map or relation) stored in memory means and indicated by broken line in FIG. 8. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force F*). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the output torque $T_E$ of the engine 8 (engine torque $T_E$). The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 52 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 52 raises the first electric motor speed $N_{M1}$ while the second electric motor speed $N_{M2}$ determined by the vehicle speed (speed of the drive wheels 34) is held substantially constant, as is apparent from the collinear chart of FIG. 3. To hold the engine speed $N_E$ substantially constant during a shifting action of the automatic transmission portion 20, the hybrid control means 52 changes the first electric motor speed $N_{M1}$ in a direction opposite to the direction of change of the second electric motor speed $N_{M2}$ caused by the shifting action of the automatic transmission portion 20, while the engine speed $N_E$ is held substantially constant.

The hybrid control means 52 includes engine output control means or an engine output control portion functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the angle of operation $A_{CC}$ of the accelerator pedal and according to a predetermined stored relationship (not shown) between the angle of operation $A_{CC}$ and the opening angle $\theta_{TH}$ of the electronic throttle valve 96 such that the opening angle $\theta_{TH}$ increases with an increase of the angle of operation $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 7:
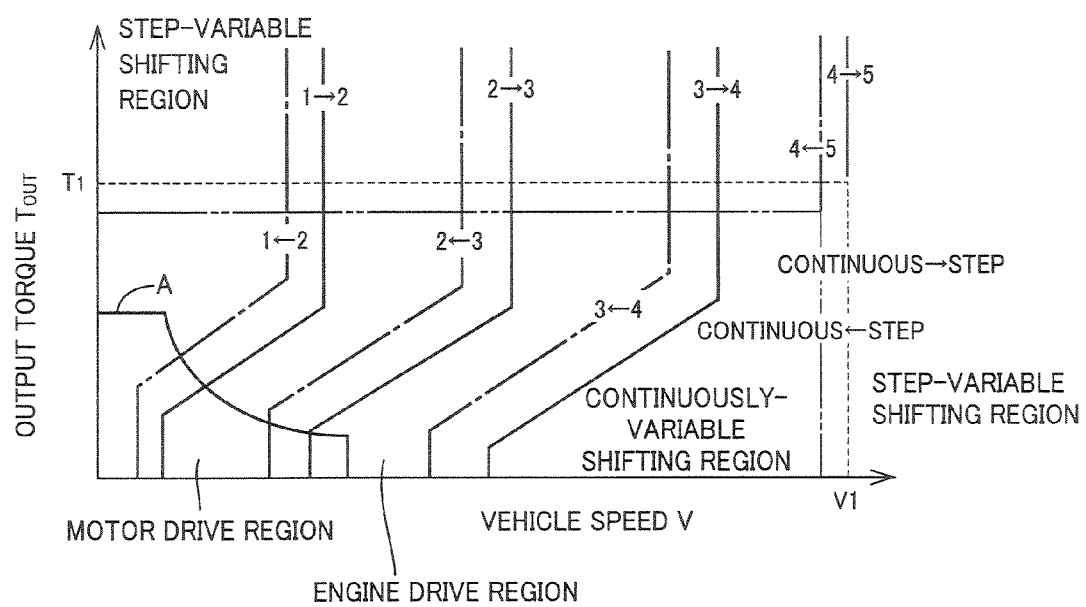
FIG. 7 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. Solid line A in FIG. 7 represents an example of a boundary line defining an engine-drive region and a motor-drive region, for switching the vehicle drive power source for starting and driving (hereinafter collectively referred to as "driving") the vehicle, between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 7 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 7.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 7. As is understood from FIG. 7, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 7, as a result of an increase of the required output torque $T_{OUT}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 34. Thus, the second electric motor M2 may be used in addition to the engine 8, in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off a supply of an electric current from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 functions as electric-motor control means configured to place the first electric motor M1 in the non-load state, for thereby placing the differential portion 11 in a neutral state in which the power transmitting path is electrically cut off.

The hybrid control means 52 is further arranged to implement a 4WD control for driving the second drive wheels 39 in addition to the drive wheels 34 to drive the vehicle. For instance, the hybrid control means 52 is configured to calculate a distribution of front and rear drive torques during starting and rapid acceleration of the vehicle, and during running of the vehicle on a roadway having a low friction coefficient, on the basis of the angle of accelerator pedal operation $A_{CC}$, vehicle speed V, rotating speed of each wheel, longitudinal acceleration value G, etc. Namely, the hybrid control means 52 calculates a front drive torque $T_F^*$ required to drive the drive wheels 34, and a rear drive torque $T_R^*$ required to drive the second drive wheels 39, and commands the engine output control device 43 to control the engine torque, for driving the drive wheels 34, and to supply the third electric motor M3 with an electric energy through the inverter 58, for driving the second drive wheels 39. While the drive wheels 34 may be driven by the output of the engine 8 only, the drive wheels 34 may be driven by the output of the second electric motor M2 as well as the output of the engine 8, or by the output of the second electric motor M2 only.

The hybrid control means 52 is further arranged such that an electric energy generated by the first electric motor M1 driven by the output of the engine 8 is supplied through the inverter 58 to the third electric motor. Thus, the first electric motor M1 functions as an electric generator driven by the output of the engine 8. When the first electric motor M1 functions as the electric generator, the operating speeds of the engine 8 and the first electric motor M1 can be controlled as needed owing to the differential function of the differential portion 11, irrespective of the vehicle speed V. Thus, the hybrid control means 52 permits the first electric motor M1 to supply the third electric motor M3 with a sufficient amount of electric energy for providing the rear drive torque $T_R^*$, while permitting the first electric motor M1 to be operated at the predetermined first electric motor speed $N_{M1}$ that assures a maximum efficiency of electricity generation by the first electric motor M1. The hybrid control means 52 may be arranged such that the third electric motor M3 is supplied through the inverter 58 with an electric energy from the electric-energy storage device 60 as well as the electric energy generated by the first electric motor M1, where the drive torque to be distributed to the second drive wheels 39 is relatively large for rapid acceleration of the vehicle, provided that the amount of electric energy SOC stored in the electric-energy storage device 60 is larger than a predetermined value.

The hybrid control means 52 is further configured to also function as regenerative-brake control means or a regenerative-brake control portion operated for a so-called "regenerative braking control" of the vehicle during deceleration or braking of the vehicle without an operation of the accelerator pedal. The regenerative-brake control means or portion controls the second electric motor M2 or third electric motor M3 to be operated as an electric generator by a reverse drive force transmitted to the engine 8 from the drive wheels 34 driven by a kinetic energy of the running vehicle, so that the electric-energy storage device 60 is charged with a second-electric-motor-generated electric current $I_{M2G}$ or a third-electric-motor-generated electric current $I_{M3G}$ which is generated by the second or third electric motor M2, M3 and which is supplied to the electric-energy storage device 60 through the inverter 58.

High-speed-gear determining means (Higher-speed-gear determining portion) 62 is arranged to determine whether the gear position to which the transmission mechanism 10 should be shifted on the basis of the vehicle condition and according to the shifting boundary line map stored in the memory means 56 and indicated in FIG. 7 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

Switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means or a differential limiting portion for limiting the operation of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 7 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, for example, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, on the other hand, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 as a whole placed in the continuously-variable shifting sate is continuously variable.

The maps of FIG. 7 will be described in detail. The shifting boundary line map (shifting control map or relation) shown in FIG. 7 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 7, the solid lines indicate the shift-up boundary lines, while the one-dot chain lines indicate the shift-down boundary lines.

The broken lines in FIG. 7 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching boundary line map (switching control map or relation) used by the switching control means (switching control portion) 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures. For example, the switching control means 50 determines whether there has arisen any functional failure or deterioration of the electric components such as the electric motors operable to operate the differential portion 11 as the electrically controlled continuously variable transmission, and places the transmission mechanism 10 in the step-variable shifting state upon determination that any functional failure or deterioration has arisen.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 34. The parameter may be: an actual value calculated on the basis of the angle of operation $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the angle of operation $A_{CC}$ of the accelerator pedal 45 or the opening angle of the throttle valve. The above-described vehicle drive torque may be calculated on the basis of not only the output torque $T_{OUT}$, etc., but also the ratio of the differential gear device 36 and the radius of the drive wheels 34, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. Namely, the transmission mechanism 10 is effectively operated as the step-variable transmission of planetary gear type not including an electric path, during high-speed running of the vehicle.

On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, the upper output-torque limit T1 is determined to place the transmission mechanism 10 in the step-variable shifting state in the high-output running state of the vehicle, on an assumption that the vehicle operator likes to feel a change of the engine speed during a shifting action of the transmission mechanism 10 rather than to improve the fuel economy of the vehicle, in the high-output running state of the vehicle. That is, the transmission mechanism 10 is operated as the step-variable transmission the speed ratio of which is changed in steps, rather than the continuously-variable transmission, when the vehicle is running in the high-output state.

Figure 9:
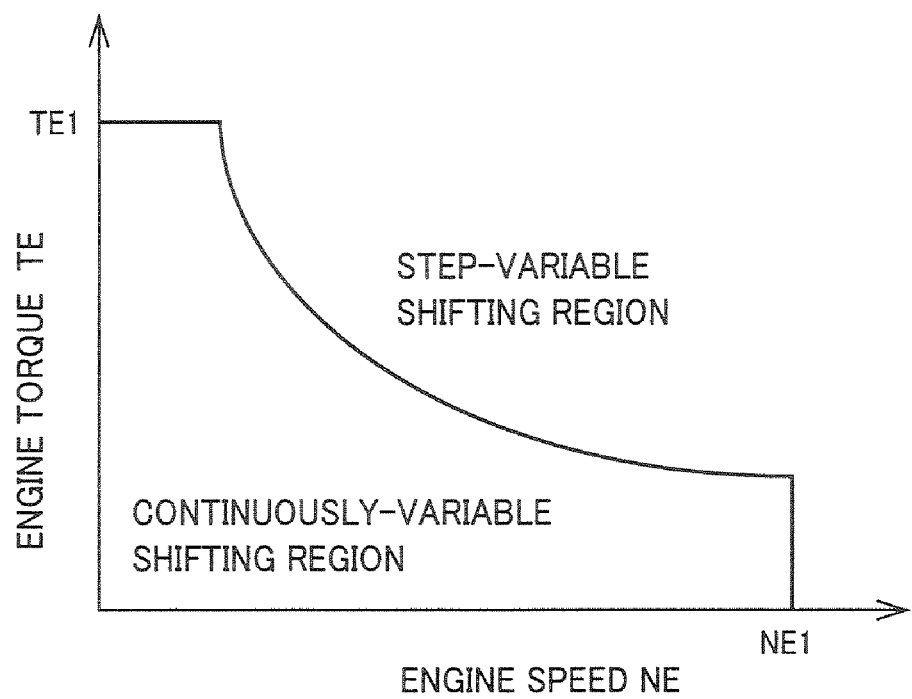
FIG. 9 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.
Figure 10:
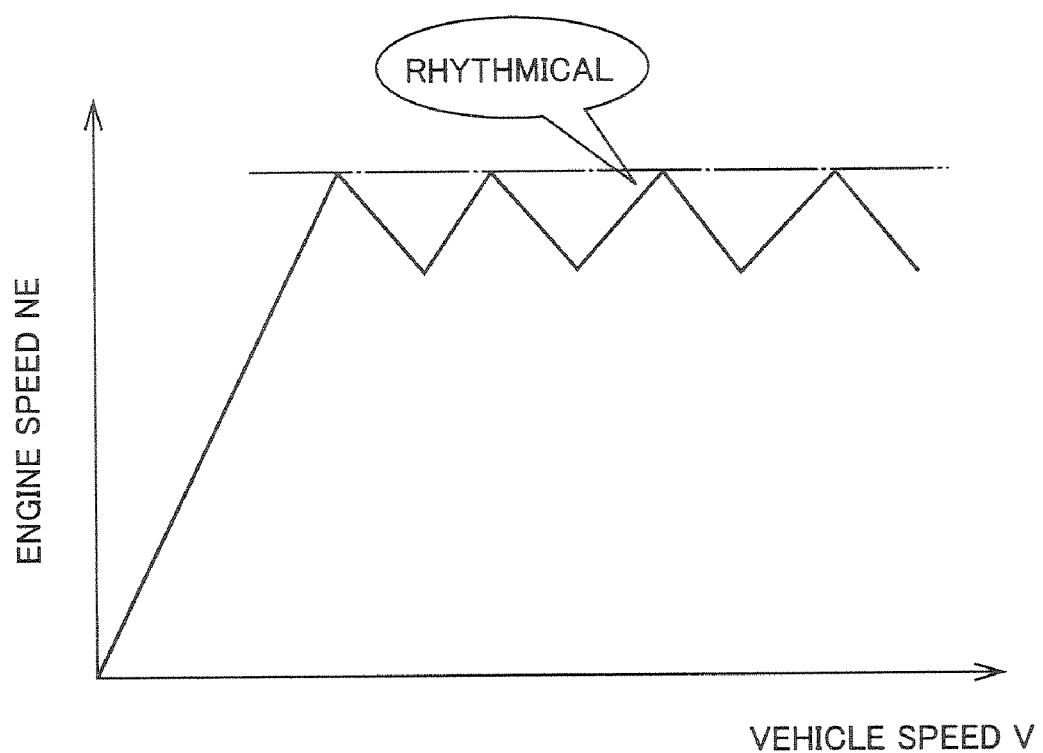
FIG. 10 is a view indicating an example of a change of the engine speed as a result of a shift-up action of the step-variable transmission.

Referring to FIG. 9, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 7, to determine whether the vehicle condition is in the continuously-variable or step-variable shifting region, on the basis of the engine speed $N_E$ and engine torque $T_E$. The switching boundary line map of FIG. 7 may be based on the switching boundary line map of FIG. 9. In other words, the broken lines in FIG. 7 may be determined on the basis of the relation (map) of FIG. 9, in the two-dimensional coordinate system defined by the control parameters in the for of the vehicle speed V and the output torque $T_{OUT}$.

The step-variable shifting region defined by the switching boundary line map of FIG. 7 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 9 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 9 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 34 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 109.

As described above, the differential portion 11 is automatically switched by the switching control means 50, between the step-variable and continuously-variable shifting states, on the basis of the vehicle condition and according to the relation of FIG. 7. However, the differential portion 11 may be switched manually as well as automatically, between the step-variable and continuously-variable shifting states, as described below.

Figure 11:
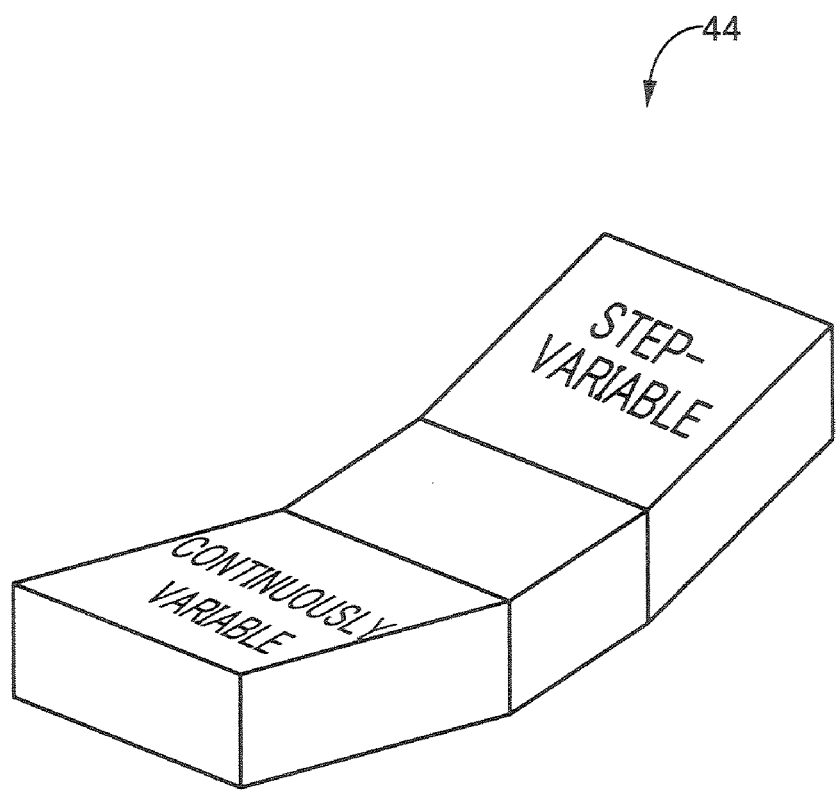
FIG. 11 is a view showing an example of a manually operable shifting-state selecting device in the form of a seesaw switch operated by a user to select the shifting state.

FIG. 11 shows an example of a seesaw switch 44 (hereinafter referred to as "switch 44") functioning as a shifting-state selecting device manually operable to select the continuously-variable shifting state (differential state or non-locked state) or the step-variable shifting state (non-continuously-variable shifting state, non-differential state or locked state) of the transmission mechanism 10 (differential portion 11 or power distributing mechanism 16). This switch 44 permits the user to select the desired shifting state during running of the vehicle. The switch 44 has a continuously-variable-shifting-run selecting button labeled "CONTINUOUSLY-VARIABLE" for running of the vehicle in the continuously-variable shifting state, and a step-variable-shifting-run selecting button labeled "STEP-VARIABLE" for running of the vehicle in the step-variable shifting state, as shown in FIG. 11. When the continuously-variable-shifting-run selecting button is depressed by the user, the switch 44 is placed in a continuously-variable shifting position for selecting the continuously-variable shifting state in which the transmission mechanism 10 is operable as the electrically controlled continuously variable transmission. When the step-variable-shifting-run selecting button is depressed by the user, the switch 44 is placed in a step-variable shifting position for selecting in the step-variable shifting state in which the transmission mechanism 10 is operable as the step-variable transmission. For instance, the switch 44 is manually operated to select the continuously-variable shifting state of the transmission mechanism 10 when the user likes a good shifting response of the continuously variable transmission and an improvement of the fuel economy, or the step-variable shifting state of the transmission mechanism 10 when the user likes a rhythmic change of the engine speed as a result of shifting actions of the step-variable transmission.

The switching control means 50 is arranged to determine whether the continuously-variable-shifting-run selecting button or the step-variable-shifting-run selecting button of the switch 44 has been depressed, and to switch the transmission mechanism 10 to the step-variable shifting state when the step-variable-shifting-run selecting button has been depressed.

When the switching control means 50 determines that the continuously-variable-shifting-run selecting button of the switch 44 has been depressed, on the other hand, the transmission mechanism 10 is not necessarily placed in the continuously-variable shifting state, but the shifting state of the transmission mechanism 10 is automatically selected on the basis of the vehicle condition and according to the relation of FIG. 7, for example, in view of a possibility that the first electric motor M1 cannot generate a reaction torque corresponding to the engine torque $T_E$ in the continuously-variable shifting state.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states. In the neutral position of the switch 44, the shifting state of the transmission mechanism 10 is automatically selected on the basis of the vehicle condition and according to the relation of FIG. 7, for example.

Figure 12:
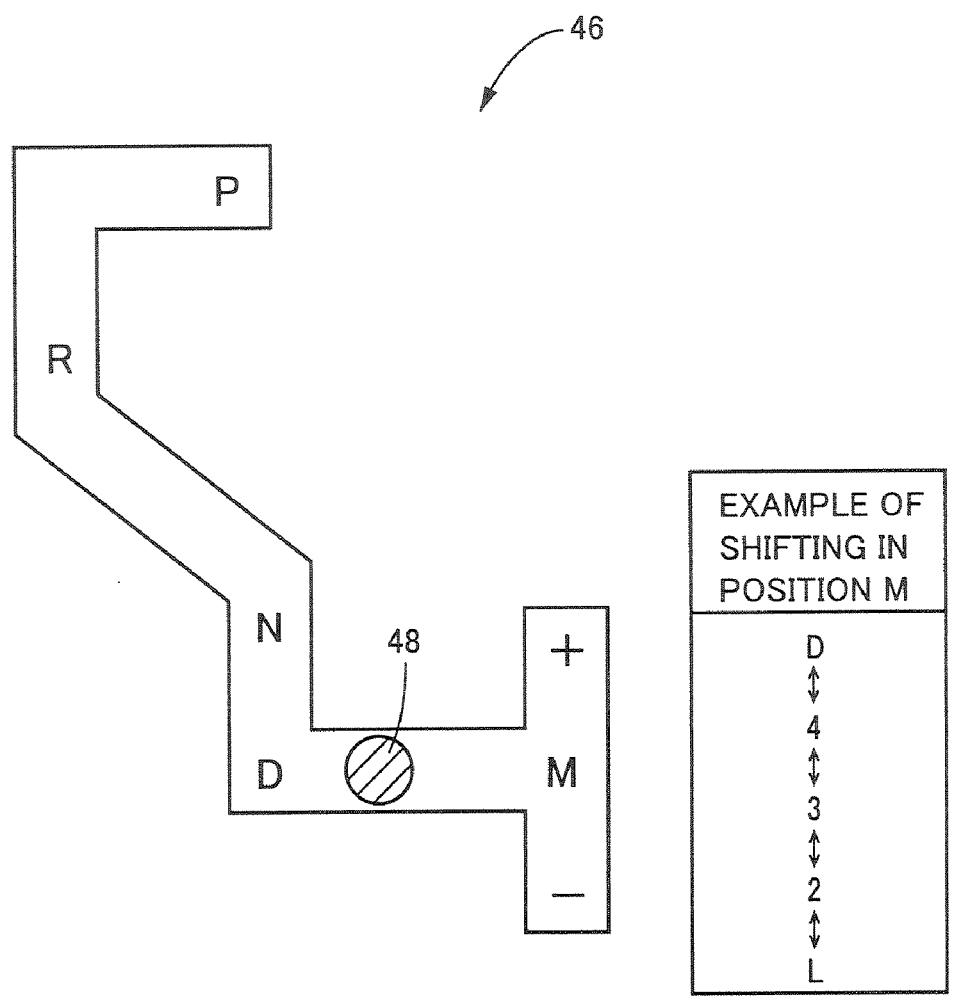
FIG. 12 is a view showing an example of a manually operated shifting device including a shift lever and operable to select one of a plurality of shift positions.

FIG. 12 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the first and second clutches C1, C2 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to control the hydraulic control unit 42, for establishing one of the reverse0drive position R, neutral position N, automatic forward-dive shifting position D, etc. indicated in the table of FIG. 2. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging the first clutch C1 and/or the second clutch C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M are applied to the electronic control device 40.

When the shift lever 48 is operated to the automatic forward-drive position D, the switching control means 50 effects an automatic switching control of the transmission mechanism 10 according to the stored switching boundary line map indicated in FIG. 7, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

The transmission mechanism 10 (differential portion 11 or power distributing mechanism 16) in the present embodiment is selectively switchable between the continuously-variable shifting state (differential state) and the non-continuously-variable shifting state (locked state or non-differential state), and the switching control means 50 selects the shifting state to which the differential portion 11 should be switched, so that the differential portion 11 is switched to the selected one of the continuously-variable shifting state and the non-continuously-variable shifting state.

When the differential portion 11 is placed in the non-differential state, the first electric motor speed $N_{M1}$ is determined or influenced by the engine speed $N_E$ and vehicle speed V, so that the first electric motor M1 cannot be operated under the control of the hybrid control means 52, at the first electric motor speed $N_{M1}$ that assures a maximum efficiency of electricity generation by the first electric motor M1. Accordingly, the amount of electric energy supplied to the third electric motor M3 is reduced, so that there is a risk of deterioration of drivability of the vehicle during the 4WD running.

In view of the above, the present embodiment is arranged such that during the 4WD running of the vehicle with the second drive wheels 39 driven by the third electric motor M3, the differential portion 11 is switched to the continuously-variable shifting state, to enable the first electric motor M1 to be operated to generate an amount of electric energy sufficient to operate the third electric motor M3 for driving the second drive wheels 39, while permitting the first electric motor M1 to be operated at the speed that assures the maximum electricity generating efficiency.

During a high-torque running of the vehicle with the engine torque $T_E$ being equal to or larger than the upper limit TE1, the differential portion 11 cannot be placed in the continuously-variable shifting state, as is apparent from FIG. 9, so that the first electric motor speed $N_{M1}$ cannot be controlled as needed. Therefore, the first electric motor M1 is operated as the electric generator while the differential portion 11 is maintained in the non-continuously-variable shifting state. In the non-continuously-variable shifting state of the differential portion 11, the second electric motor M2 can be operated as the electric generator by the output of the engine 8, so that the second electric motor M2 is used as the electric generator, in place of or in addition to the first electric motor M1. In this case, there is a possibility of reduction of the electricity generating efficiency of the first electric motor M1 and/or the second electric motor M2, but an amount of electric energy sufficient to drive the second drive wheels 39 can be supplied to the third electric motor M3. There will be described a control operation associated with the electricity generation during the 4WD running of the vehicle.

Described in detail referring back to FIG. 6, differential-state determining means (differential-state determining portion) 80 is provided for determining whether the differential portion 11 is placed in the continuously-variable shifting state and operable as the electrically controlled continuously variable transmission. For example, the determination as to whether the differential portion 11 is placed in the continuously-variable shifting state is made by determining whether the switching control means 50 has commanded the hydraulic control unit 42 to release the switching clutch C0 or switching brake B0 for placing the differential portion 11 in the continuously-variable shifting state to permit the transmission mechanism 10 as a whole to be operated in the continuously-variable shifting state.

4WD-running determining means (4WD-running determining portion) 82 is provided for determining whether the vehicle is in the 4WD running state, with the second drive wheels 39 driven by the third electric motor M3. For example, the determination as to whether the vehicle is in the 4WD running state is made by determining whether an electric energy is supplied through the inverter 58 to the third electric motor M3 under the control of the hybrid control means 52, for driving the second drive wheels 39.

Switching-to-continuously-variable-shifting-state feasibility determining means (switching-to-continuously-variable-shifting-state feasibility determining portion) 84 is provided for determining whether the switching of the differential portion 11 from the non-continuously-variable shifting state to the continuously-variable shifting state is feasible. For instance, the switching-to-continuously-variable-shifting-state feasibility determining means 84 determines that the switching of the differential portion 11 to the continuously-variable shifting state by the switching control means 50 is feasible, when the engine torque TE is equal to or larger than the predetermined upper limit $T_{E1}$, as indicated in FIG. 9. The switching-to-continuously-variable-shifting state feasibility determining means 84 determines that the switching of the differential portion 11 to the continuously-variable shifting state by the switching control means 50 is feasible, when the step-variable-shifting-run selecting button of the switch 44 has been depressed to command the switching control means 50 to place the transmission mechanism 10 in the non-continuously-variable shifting state (step-variable shifting state).

When the switching-to-continuously-variable-shifting-state feasibility determining means 84 has determined that the differential portion 11 can be switched from the non-continuously-variable shifting state to the continuously-variable shifting state while the differential-state determining means 80 determines that the differential portion 11 is not placed in the continuously-variable shifting state and while the 4WD-running determining means 82 determines that the vehicle is in the 4WD running state, the switching control means 50 commands the hydraulic control unit 42 to release the switching clutch C0 or brake B0 for switching the differential portion 11 from the non-continuously-variable shifting state to the continuously-variable shifting state.

During the 4WD running of the vehicle in the continuously-variable shifting state of the differential portion 11, the hybrid control means 52 commands the first electric motor M1 to be operated as the electric generator for generating an electric energy to be supplied to the third electric motor M3 to drive the second drive wheels 39.

When the switching-to-continuously-variable-shifting-state feasibility determining means 84 determines that the switching of the differential portion 11 from the non-continuously-variable shifting state to the continuously-variable shifting state is not feasible in the 4WD running state of the vehicle, the hybrid control means 52 commands the first electric motor M1 and/or the second electric motor M2 to be operated as the electric generator in the non-continuously-variable shifting state of the differential portion 11, for generating the electric energy to be supplied to the third electric motor M3 for driving the second drive wheels 39.

As described above, the hybrid control means 52 functions as the electric-motor control means for changing the electric generator in the 4WD running of the vehicle, depending upon whether the differential portion 11 is placed in the continuously-variable shifting state or not. The hybrid control means 52 selects the first electric motor M1 as the electric generator when the differential portion 11 is placed in the continuously-variable shifting state, and the first electric motor M1 and/or the second electric motor M2 as the electric generator when the differential portion 11 is placed in the non-continuously-variable shifting state, while taking account of the electricity generating efficiency, irrespectively of whether the vehicle is in the 4WD running state or not. Thus, the hybrid control means 52 functions as the electric-motor control means for selecting the electric generator depending upon whether the differential portion 11 is placed in the continuously-variable shifting state.

Where the hybrid control means 52 is configured to select the first electric motor M1 as the electric generator irrespective of whether the differential portion 11 is placed in the continuously-variable or non-continuously-variable shifting state, the electric generator is not changed. While the first electric motor speed $N_{M1}$ can be changed as needed in the continuously-variable shifting state of the differential portion 11, the first electric motor speed $N_{M1}$ is determined or influenced by the vehicle speed V in the non-continuously-variable shifting state of the differential portion 11. Namely, the first electric motor M1 is used in different conditions of electricity generation in the continuously-variable and non-continuously-variable shifting states. Therefore, the hybrid control means 52 functions as the electric-motor control means for changing the condition of generation of an electric energy depending upon whether the differential portion is placed in the continuously-variable shifting state or not. A change of the electric generator is one form of a change of the condition of generation of the electric energy.

It is possible that none of the first electric motor M1 and the second electric motor M2 can be used as the electric generator. Where the first and second electric motors M1, M2 cannot be used as the electric generator due to a failure or functional deterioration thereof, the electric energy is supplied from the electric-energy storage device.

Described in detail, M1/M2 electricity-generation feasibility determining means (M1/M2 electricity-generation feasibility determining portion) 86 is provided for determining whether at least one of the first and second electric motors M1, M2 can be used as the electric generator. For example, the determination as to whether at least one of the first and second electric motors M1, M2 is operable as the electric generator or not is made by determining whether the first electric motor M1 or the second electric motor M2 suffers from a failure or functional deterioration, or whether there exists a failure of functional deterioration of any component associated with the electric path. These determinations may be made on the basis of the state of electrical continuity of the first and second electric motors M1, M2, and the first electric motor speed $N_{M1}$ and the second electric motor speed $N_{M2}$.

The hybrid control means 52 is arranged to supply an electric energy form the electric-energy storage device 60 when the M1/M2 electricity-generation feasibility determining means 86 has determined that neither the first electric motor M1 nor the second electric motor M2 can be used as the electric generator. For example, the hybrid control means 52 supplies the electric energy from the electric-energy storage device 60 to the third electric motor M3 for driving the second drive wheels 39, when the M1/M2 electricity-generation feasibility determining means 86 has determined that neither the first electric motor M1 nor the second electric motor M2 can be used as the electric generator while the switching-to-continuously-variable-shifting-state feasibility determining means 84 determines that the switching of the differential portion 11 from the non-continuously-variable shifting state to the continuously-variable shifting state is not feasible.

Figure 13:
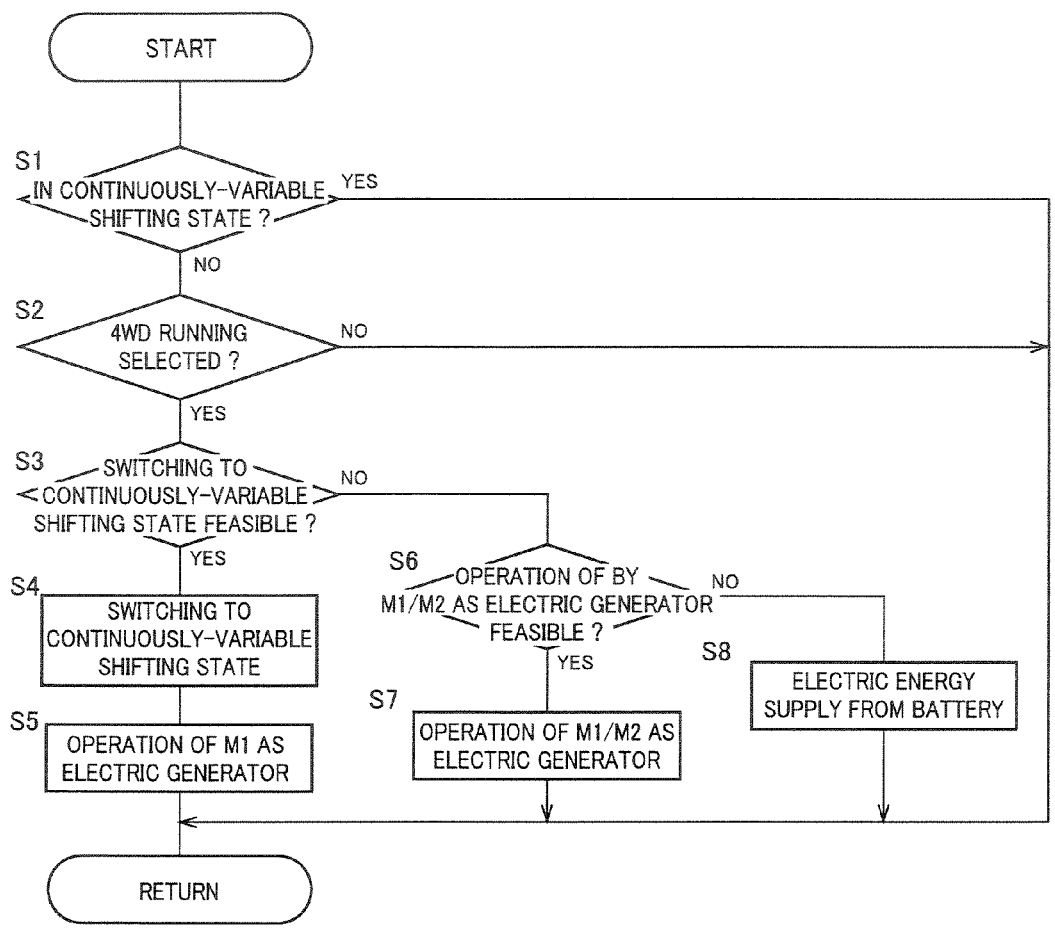
FIG. 13 is a flow chart illustrating a control operation of the electronic control device of FIG. 5, that is, a control routine executed to supply a third electric motor with an electric energy required to drive second drive wheels during 4WD running of the vehicle while the differential portion is placed in a non-continuously-variable shifting state.

FIG. 13 is a flow chart illustrating a major control operation of the electronic control device 40, that is, a control routine executed to supply the third electric motor M3 with an electric energy required to drive the second drive wheels 39 in the 4WD running state of the vehicle while the differential portion 11 is placed in the non-continuously-variable shifting state. This control routine is repeatedly executed with an extremely short cycle time of about several milliseconds to about several tens of milliseconds.

The control routine is initiated with step S1 (hereinafter "step" being omitted) corresponding to the differential-state determining means 80 or a differential 0-state determining step, to determine whether the differential portion 11 is placed in the continuously-variable shifting state or not.

If an affirmative determination is obtained in S1, the present control routine is terminated. If a negative determination is obtained in S1, the control flow goes to S2 corresponding to the 4WD-running determining means 82 or a 4WD-running determining step, to determine whether the vehicle is in the 4WD running state, with the second drive wheels 39 driven by the third electric motor M3.

If a negative determination is obtained in S2, the present control routine is terminated. If an affirmative determination is obtained in S2, the control flow goes to S3 corresponding to the switching-to-continuously-variable-shifting-state feasibility determining means 84 or a switching-to-continuously-variable-shifting-state feasibility determining step, to determine whether the switching of the differential portion 11 from the non-continuously-variable shifting state to the continuously-variable shifting state is feasible or not. When the vehicle is in a high-output running state with the engine torque TE being equal to or larger than the upper limit TE1, it is determined that the differential portion 11 cannot be switched to the continuously-variable shifting state, as is apparent from FIG. 9.

If an affirmative determination is obtained in S3, the control flow goes to S4 corresponding to the switching control means 50 or a switching control step, in which the hydraulic control unit 42 is commanded to release the switching clutch C0 or switching brake B0 for switching the differential portion 11 from the non-continuously-variable shifting state to the continuously-variable shifting state.

The above-indicated step S4 is followed by S5 corresponding to the hybrid control means 52 or a hybrid control step, in which the first electric motor is operated as the electric generator to generate an electric energy to be supplied to the third electric motor M3 for driving the second drive wheels 39.

If a negative determination is obtained in S3, the control flow goes to S6 corresponding to the M1/M2 electricity-generation feasibility determining means 86 or an M1/M2 electricity-generation feasibility determining portion, to determine whether at least one of the first and second electric motors M1, M2 is operable as the electric generator.

If an affirmative determination is obtained in S6, the control flow goes to S7 corresponding to the hybrid control means 52 or hybrid control step, in which the first electric motor M1 and/or the second electric motor M2 is/are operated as the electric generator to generate the electric energy to be supplied to the third electric motor M3 for driving the second drive wheels 39.

If a negative determination is obtained in S6, the control flow goes to S8 corresponding to the hybrid control means 52 or hybrid control portion, in which the electric energy is supplied to the third electric motor M3 for driving the second electric motor 39.

In the present embodiment described above, the switching clutch C0 or switching brake B0 is provided to switch the differential portion 11 between the continuously-variable shifting state and the non-continuously-variable shifting state, for example. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine 8 is transmitted to the drive wheel primarily through the mechanical power transmitting path, so that the fuel economy is improved owing to reduction of a loss of conversion of a mechanical energy into an electric energy, which would take place when the differential portion 11 is operated as a transmission the speed ratio of which is electrically variable. Where the differential portion 11 is placed in the non-continuously-variable shifting state during a high-output running state of the vehicle, the differential portion 11 is operated as a transmission the speed ratio of which is electrically variable, only when the vehicle speed or output is relatively low or medium, so that the required amount of electric energy generated by the first electric motor M1, that is, the maximum amount of electric energy that must be transmitted from the electric motor M1 can be reduced, making it possible to minimize the required sizes of the first electric motor M1 and the second electric motor M2 to which the electric energy is transmitted from the first electric motor, and the required size of the transmission mechanism 10 including those first and second electric motors M1, M2.

The present embodiment is further arranged such that the switching control means 40 is operated during the four-wheel drive running of the vehicle with the second drive wheels 39 driven by the third electric motor M3, to switch the differential portion 11 to the differential state (continuously-variable shifting state), so that the operating speed of the first electric motor M1 which is operated by the output of the engine 8 as an electric generator is controlled to assure a higher degree of electricity generating efficiency, owing to the differential function of the differential mechanism portion 11, than when the differential portion 11 is placed in the non-differential state (non-continuously-variable shifting state) in which the first electric motor speed $N_{M1}$ and the engine speed $N_E$ are determined by vehicle running speed V.

For instance, the first electric motor M1 is operated at a speed $N_{M1}$ which permits the first electric motor M1 to generate a sufficient amount of electric energy to be supplied to the third electric motor M3 for driving the second drive wheels 39, and which assures a maximum electricity generating efficiency of the first electric motor M1. Accordingly, it is possible to reduce deterioration of drivability of the vehicle during the four-wheel drive running with the second drive wheels 39 driven by the third electric motor M3.

The present embodiment is further arranged such that the condition of generation of the electric energy is changed by the hybrid control means 52 depending upon whether the differential portion 11 is placed in the continuously-variable shifting state or not, so that the amount of generation of the electric energy is suitably controlled depending upon the present shifting state of the differential portion 11.

During the 4WD running of the vehicle with the second drive wheels 39 driven by the third electric motor 39, for example, the condition of generation of the electric energy is changed by the hybrid control means 52, so that it is possible to generate the electric energy to be supplied to the third electric motor M3 for driving the second drive wheels 49, thereby making it possible to reduce deterioration of the vehicle drivability during the electric-4WD running of the vehicle with the second drive wheels 39 driven by the third electric motor M3. Further, the vehicle can be run in the electric-4WD running stet, without a supply of an electric energy form the electric-energy storage device 50 to the third electric motor M3, so that the required size of the electric-energy storage device 60 can be reduced.

The present embodiment is further arranged such that the hybrid control means 52 changes the condition of generation of the electric energy, by changing the electric motor operated as the electric generator. Namely, the hybrid control means 52 uses the first electric motor M1 and/or the second electric motor M2 as the electric generator, depending upon whether the differential portion 11 is placed in the continuously-variable shifting state or not, that is, depending upon the present shifting state of the differential portion 11, so that the required amount of electric energy is generated.

The present embodiment is further arranged such that the hybrid control means 52 operates the first electric motor M1 as the electric generator when the differential portion 11 is placed in the continuously-variable shifting state. Accordingly, the operating speed of the first electric motor M1 is controlled to a value assuring a high efficiency of electricity generation, owing to the differential function of the differential portion 11 placed in the continuously-variable shifting state, making it possible to assure a higher degree of electricity generating efficiency of the first electric motor M1. In the 4WD running state of the vehicle, for example, the first electric motor M1 generates an amount of electric energy sufficient to operate the third electric motor M3 for driving the second drive wheels 39, while at the same time the first electric motor M1 is operated at the speed $N_{M1}$ that assures a maximum efficiency of electricity generation of the first electric motor M1. Therefore, it is possible to reduce the deterioration of the vehicle drivability in the electric 4WD running state with the second drive wheels 39 driven by the third electric motor M3.

The present embodiment is further arranged such that the hybrid control means 52 operates the first electric motor M1 and/or the second electric motor M2 as the electric generator when the differential portion 11 is placed in the non-continuously-variable shifting state. Accordingly, the first electric motor M1 and/or the second electric motor M2 generates the required amount of electric energy. In the 4WD running state of the vehicle, for example, the first electric motor M1 and/or the second electric motor M2 provide or provides an amount of electric energy sufficient to operate the third electric motor M3 for driving the second drive wheels 39, making it possible to reduce the deterioration of the vehicle drivability in the electric 4WD running state with the second drive wheels 39 driven by the third electric motor M3.

In the present embodiment, the hybrid control means 52 is configured to supply the required electric energy from the electric-energy storage device 60 when the first electric motor M1 and the second electric motor M2 cannot be used as the electric generator. In the 4WD running state of the vehicle, for example, the electric-energy storage device 60 provides an amount of electric energy sufficient to operate the third electric motor M3 for driving the second drive wheels 39, making it possible to reduce the deterioration of the vehicle drivability in the electric 4WD running state with the second drive wheels 39 driven by the third electric motor M3.

There will next be described another embodiment of this invention. In the following description, the same reference signs as used in the preceding embodiment will be used to identify the corresponding elements.

Embodiment 2

Figures 14, 15:
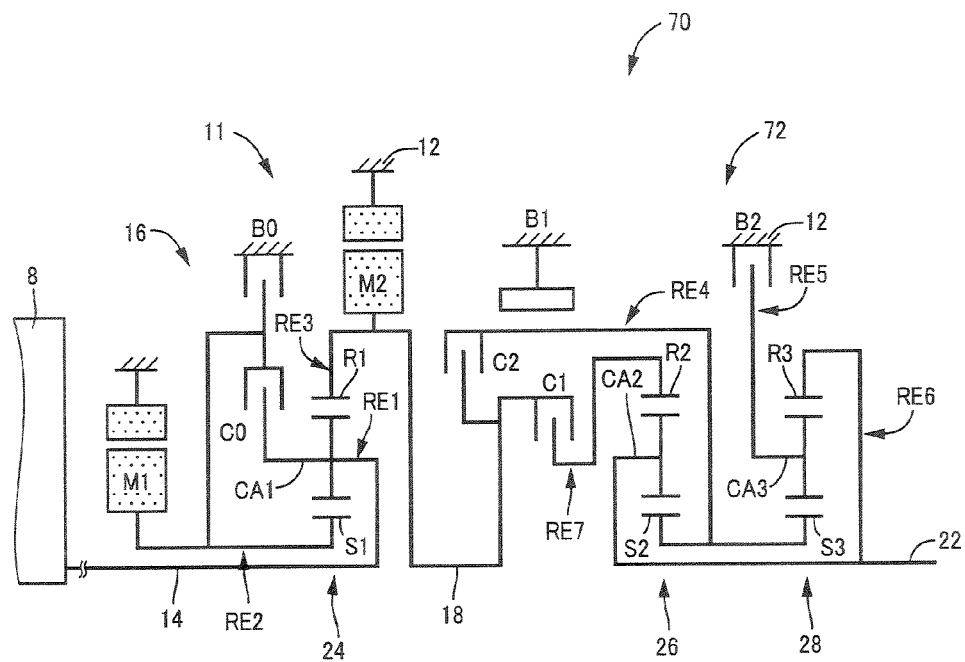
FIG. 14 is a schematic view corresponding to that of FIG. 1, for explaining an arrangement of a hybrid vehicle drive system according to another embodiment of the present invention.
FIG. 15 is a table corresponding to that of FIG. 2, indicating shifting actions of the hybrid vehicle drive system of FIG. 14, which is operable in a selected one of the continuously-variable and step-variable shifting states, in relation to different combinations of operating states of hydraulically operated frictional coupling devices to effect the respective shifting actions.
Figure 16:
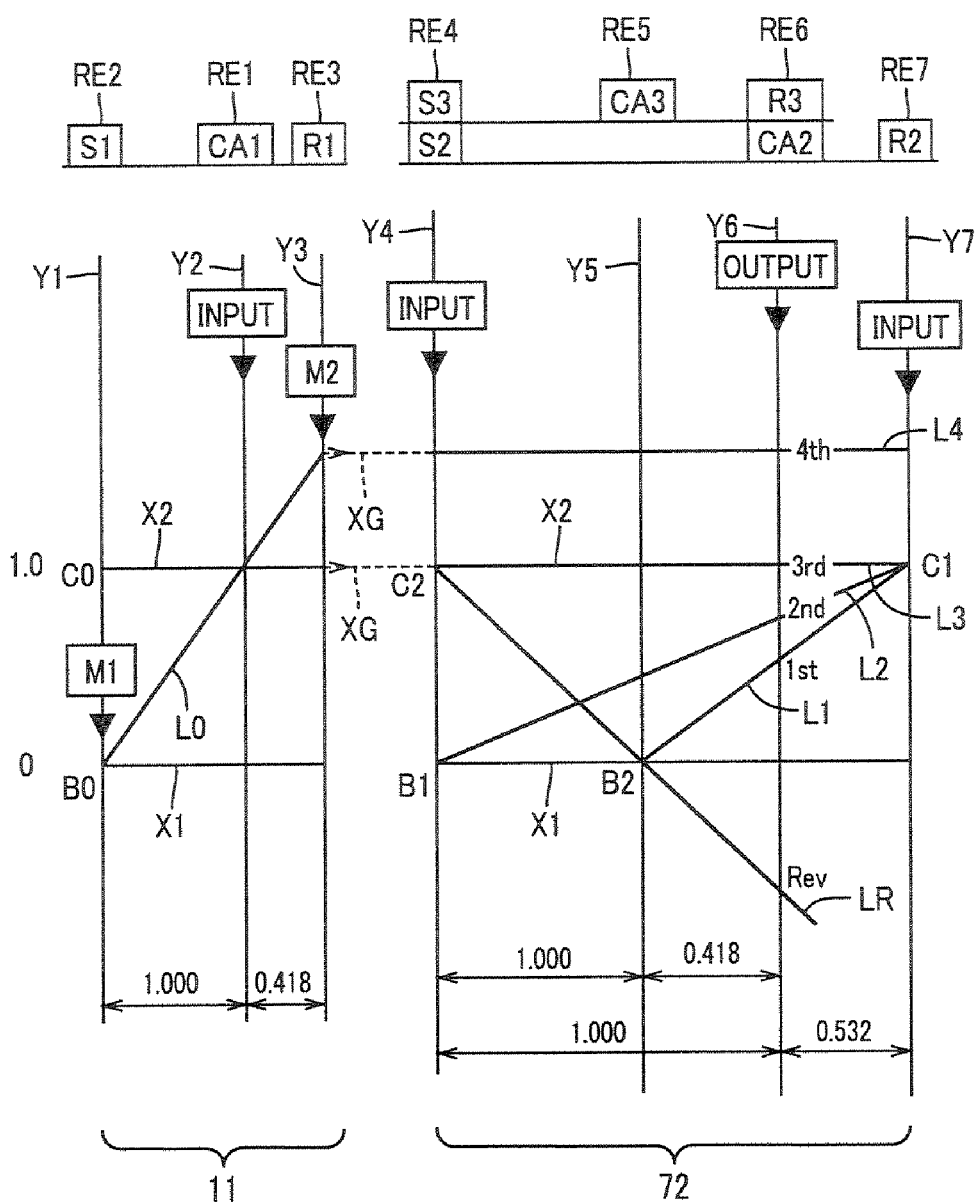
FIG. 16 is a collinear chart corresponding to that of FIG. 3, indicating relative rotating speeds of the rotary elements of the hybrid vehicle drive system of FIG. 14 in the step-variable shifting state, in the different gear positions.

FIG. 14 is a schematic view for explaining an arrangement of a transmission mechanism 70 in another embodiment of this invention, and FIG. 15 a table indicating a relationship between the gear positions of the transmission mechanism 70 and different combinations of engaged states of the hydraulically operated frictional coupling devices for respectively establishing those gear positions, while FIG. 16 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is interposed between the differential portion 11 and the output shaft 22 and is connected in series to the differential portion 11 through the power transmitting member 18. The power distributing mechanism 16 includes the single-pinion type first planetary gear set 24 having a gear ratio $\rho 1$ of about 0.418, for example, and the switching clutch C0 and the switching brake B0. The automatic transmission portion 72 includes the single-pinion type second planetary gear set 26 having a gear ratio $\rho 2$ of about 0.532, for example, and the single-pinion type third planetary gear set 28 having a gear ratio $\rho 3$ of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 15. Those gear positions have respective speed ratios γ (input shaft speed $N_{14}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 15. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 15, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 as a whole is continuously variable.

FIG. 16 is a collinear chart which indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 16 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment.

In FIG. 16, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 16. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the (step-variable) shifting portion or second shifting portion, so that the present transmission mechanism 70 has advantages similar to those of the first embodiment.

While the preferred embodiments of this invention have been described in detail by reference to the accompanying drawings, it is to be understood that the present invention may be otherwise embodied.

In the electric 4WD drive systems described above, the front wheels (drive wheels 34) are driven primarily by the output of the engine 8 through the transmission mechanism 10, while the rear wheels (second drive wheels 39) are driven primarily by the third electric motor M3. However, the electric 4WD drive system may be arranged such that the rear wheels are driven primarily by the output of the engine 8 through the transmission mechanism 10, while the front wheels are driven primarily by the third electric motor M3.

In the preceding embodiments, the 4WD-running determining means 82 (step S2 of FIG. 13) is configured to make the determination as to whether the vehicle is in the 4WD running state, by determining whether the second drive wheels 39 are driven by the third electric motor M3 operated with the electric energy supplied through the inverter 58 under the control of the hybrid control means. However, the determination as to whether the vehicle is in the 4WD running state may be made by determining whether the electric generator has been commanded to generate the electric energy to be supplied to the third electric motor M3. Further, the third electric motor M3 may be temporarily supplied with the electric energy from the electric-energy storage device 60, rather than the electric energy generated by the electric generator. In this case, the electric generator is commanded to be operated to generate the electric energy, when it is determined that the amount of electric energy SOC stored in the electric-energy storage device 60 is not larger than the predetermined value.

In the preceding embodiments, the differential portion 11 is switched to the continuously-variable shifting state, in the 4WD running state of the vehicle with the second drive wheels 39 driven by the third electric motor M3, for the purpose of enabling the first electric motor M1 to be operated at the speed that assures a maximum efficiency of generation of electricity, while permitting the first electric motor M1 to generate the electric energy to be supplied to the third electric motor M3 for driving the second drive wheels 39. However, the hybrid control means (electric-motor control means) 52 may be arranged to switch the differential portion 11 to the continuously-variable shifting state, during running of the vehicle with the first drive wheels 34 driven by the second electric motor M2, for the purpose of enabling the first electric motor M1 to be operated at the speed assuring the maximum efficiency of electricity generation, while permitting the first electric motor M1 to generate the electric energy to be supplied to the second electric motor M2 for driving the first drive wheels 34.

In the preceding embodiments, the switching control means 50 is arranged to switch the differential portion 11 to the continuously-variable shifting state in the 4WD running state of the vehicle with the second drive wheels 39 driven by the third electric motor M3. However, the switching control means 50 may be arranged to switch the differential portion 11 to the continuously-variable shifting state in any other running state of the vehicle which requires generation of an electric energy, for the purpose of enabling the first electric motor M1 to be operated at the speed assuring the maximum efficiency of electricity generation, while permitting the first electric motor M1 to generate a required amount of electric energy.

The switching-to-continuously-variable-shifting-state feasibility determining means (step S3 of FIG. 13) in the illustrated embodiments may be modified such that the determination as to whether the switching of the differential portion 11 from the non-continuously-variable shifting state to the continuously-variable shifting state is feasible is made by determining whether the switching clutch C0 or brake B0 can be released according to a command received from the switching control means 50. For instance, the determination by the switching-to-continuously-variable-shifting-state feasibility determining means 84 as to whether the switching clutch C0 or brake B0 can be released may be made by determining whether the switching clutch C0 or brake B0 suffers from a failure of its friction members or hydraulic actuator, whether the solenoid-operated valve of the hydraulic control unit 42 for controlling the hydraulic actuator suffers from a failure, or whether the switching clutch or brake suffers from a delayed operating response due to functional deterioration of the hydraulic actuator or the solenoid-operated valve or due to a low temperature of the working fluid.

In the illustrated embodiments, the differential-state determining means 80 (step S1 of FIG. 13) is configured to make the determination as to whether the differential portion 11 is placed in the continuously-variable shifting state, by determining whether the switching control means 50 has commanded the hydraulic control unit 42 to release the switching clutch C0 or brake B0. However, the determination by the differential-state determining means 80 may be made by determining whether the vehicle condition is in the continuously-variable shifting region defined by the switching boundary line map indicated in FIG. 7, or whether the continuously-variable-shifting-run selecting button or the step-variable-shifting-run selecting button of the switch 44 has been depressed, or on the basis of a result of the determination by the switching control means 50 as to whether the transmission mechanism 10 should be switched to the step-variable shifting state or the continuously-variable shifting state, or on the basis of a result of the determination by the switching control means 50 as to whether the switch 44 has been operated to select the continuously-variable or step-variable shifting state.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 or power distributing mechanism 16) which is switchable between the differential and non-differential states.

In the illustrated embodiments, the first clutch C1 and the second clutch C2 are provided in the automatic transmission portion 20, 72, as the coupling devices operable to place the power transmitting path in a selected one of the power transmitting state and the power cut-off state. The first and second clutches C1, C2 are disposed between the automatic transmission portion 20, 72 and the differential portion 11. However, the these first and second clutches C1, C2 may be replaced by at least one coupling device operable to switch the power transmitting path between the power transmitting and cut-off states. For example, the at least one coupling device may be connected to the output shaft 22 or an appropriate rotary member of the automatic transmission portion

20, 72. Further, the at least one coupling device need not be a part of the automatic transmission portion 20, 72, and may be provided independently of the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears, a belt or a speed reducing device. Although the second electric motor M2 is connected to the power transmitting member 18, the second electric motor M2 may be connected to the output shaft 22, or any rotary member of the automatic transmission portion 20, 72. An arrangement in which the second electric motor M2 is connected to the power transmitting member 18 or output shaft 22 through gears, belt or speed reducing device is an example of an arrangement in which the second electric motor M2 is disposed in a power transmitting path between the power transmitting member and the drive wheels.

Although the power distributing mechanism 16 described above is provided with the switching clutch C0 and the switching brake B0, both of the switching clutch C0 and switching brake B0 need not be provided. While the switching clutch C0 is provided to selectively connect the sun gear S1 and the carrier CA1 to each other, the switching clutch C0 may selectively connect the sun gear S1 and the ring gear R1 to each other or the carrier CA1 and the ring ear R1 to each other. Namely, the switching clutch C0 is required to connect any two of the three elements of the first planetary gear set 24 to each other.

The transmission mechanisms 10, 70 of the preceding embodiments are placed in the neutral position N by engaging the switching clutch C0. However, the switching clutch C0 need not be engaged to establish the neutral position N.

The hydraulically operated frictional coupling devices used as the switching clutch C0, switching brake B0, etc. in the illustrated embodiments may be replaced by coupling devices of a magnetic-power type, an electromagnetic type or a mechanical type, such as a powder clutch (magnetic powder clutch), an electromagnetic clutch and a meshing type dog clutch.

In the illustrated embodiments, the automatic transmission portion 20, 72 is disposed in the power transmitting path between the drive wheels 34, and the power transmitting member 18 which is the output member of the differential portion 11 or power distributing mechanism 16. However, the automatic transmission portion 20, 72 may be replaced by any other type of power transmitting device (transmission), for example, automatic transmissions such as a continuously variable transmission (CVT), and a permanent-mesh parallel-two-axes type transmission well known as a manual transmission and which is automatically shifted by select cylinders and shift cylinders, and manual transmissions such as a manually shifted synchronous-mesh type transmission. Where the automatic transmission portion 20, 72 is replaced by the continuously variable transmission (CVT), the transmission mechanism as a whole is placed in the step-variable shifting state when the power distributing mechanism 16 is placed in the fixed-speed-ratio shifting state. In the step-variable shifting state, the vehicle drive force is transmitted through a mechanical power transmitting path, and not transmitted through an electric path. The above-indicated continuously variable transmission may be controlled to establish a plurality of fixed speed ratios stored in a memory, which speed ratios correspond to those of a step-variable transmission. The present invention does not require the provision of the automatic transmission portion 20, 72. Where the automatic transmission portion 20, 72 is a continuously variable transmission (CVT) or permanent-mesh type transmission, the power transmitting path between the power transmitting member 18 and the drive wheels 34 is provided with a coupling device, which is selectively engaged or released to place the power transmitting path in a selected one of the power transmitting state and the power cut-off state.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state). The planetary ear sets are not limited to a single-pinion type, but may be a double-pinion type.

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including a continuously-variable transmission portion which is operable as an electrically controlled continuously variable transmission and which has a differential mechanism operable to distribute an output of an engine to a first electric motor and a power transmitting member, a second electric motor connected to a power transmitting path between the power transmitting member and a first drive wheel of a vehicle, and a differential limiting device provided in said differential mechanism and operable to limit a differential function of said differential mechanism, for limiting an operation of said continuously-variable transmission portion as said electrically controlled continuously variable transmission, said vehicular drive system further including a third electric motor for driving a second drive wheel of the vehicle, said control apparatus comprising:
    differential-state switching means operated when driving of said second drive wheel by said third electric motor is selected, for switching said continuously-variable transmission portion to a continuously-variable shifting state in which the continuously-variable transmission portion is operable as said electrically controlled continuously variable transmission.

2. The control apparatus according to claim 1, wherein said switching control means switches said continuously-variable transmission portion to said continuously-variable shifting state, irrespective of whether a manually operable step-variable-shifting-run selecting member has been operated to select a step-variable shifting state of the continuously-variable transmission portion or not while the driving of said second drive wheel by said third electric motor is selected, said continuously-variable transmission portion placed in said step-variable shifting state being not operable as said electrically controlled continuously-variable transmission.

3. The control apparatus according to claim 1, wherein said switching control means inhibits switching of said continuously-variable transmission portion to said continuously-variable shifting state when a torque of the engine is equal to or larger than a predetermined value, even while the driving of said second drive wheel by said third electric motor is selected.

4. The control apparatus according to claim 1, wherein said switching control means switches said continuously-variable shifting portion to said continuously-variable shifting state, and operates said first electric motor as an electric generator, when the driving of said second drive wheel by said third electric motor is selected.

5. A control apparatus for a vehicular drive system including a differential portion which is operable as an electrically controlled differential device and which has a differential mechanism operable to distribute an output of an engine to a first electric motor and a power transmitting member, a second electric motor connected to a power transmitting path between the power transmitting member and a first drive wheel of a vehicle, and a differential limiting device provided in said differential mechanism and operable to limit a differential function of said differential mechanism, for limiting an operation of said differential portion as said electrically controlled differential device, said vehicular drive system further including a third electric motor for driving a second drive wheel of the vehicle, said control apparatus comprising:
    differential-state switching means operated when driving of said second drive wheel by said third electric motor is selected, for switching said differential portion to a differential state in which the differential portion is operable as said electrically controlled differential device.

6. The control apparatus according to claim 5, wherein said switching control means switches said differential portion to said differential state, irrespective of whether a manually operable step-variable-shifting-run selecting member has been operated to select a non-differential state of the differential portion or not while the driving of said second drive wheel by said third electric motor is selected, said differential portion placed in said non-differential state being not operable as said electrically controlled differential device.

7. The control apparatus according to claim 5, wherein said switching control means inhibits switching of said differential portion to said differential state when a torque of the engine is equal to or larger than a predetermined value, even while the driving of said second drive wheel by said third electric motor is selected.

8. The control apparatus according to claim 5, wherein said switching control means switches said differential portion to said differential state, and operates said first electric motor as an electric generator, when the driving of said second drive wheel by said third electric motor is selected.

9. A control apparatus for a vehicular drive system including a continuously-variable transmission portion which is operable as an electrically controlled continuously variable transmission and which has a differential mechanism operable to distribute an output of an engine to a first electric motor and a power transmitting member, a second electric motor connected to a power transmitting path between the power transmitting member and a drive wheel of a vehicle, and a differential-state switching device provided in said differential mechanism and operable to selectively switch said continuously-variable transmission portion between a continuously-variable shifting state in which the continuously-variable transmission portion is operable as an electrically controlled continuously variable transmission, and a non-continuously-variable shifting state in which the continuously-variable transmission portion is not operable as the electrically controlled continuously variable transmission, said control apparatus comprising:

electric-motor control means for changing a condition of generation of an electric energy depending upon whether a differential function of said differential mechanism is limited during high-speed, high-torque, or high-output running of the vehicle, or not.

10. The control apparatus according to claim 9, wherein the vehicular drive system further includes a third electric motor for driving a second drive wheel of the vehicle different from said drive wheel of said continuously-variable transmission portion, and said electric-motor control means changes the condition of generation of an electric energy to be supplied to said third electric motor, during running of the vehicle with said second drive wheel driven by said third electric motor.

11. The control apparatus according to claim 9, wherein the electric-motor control means changes the condition of generation of said electric energy, by changing an electric generator operated by an output of said engine to generate the electric energy.

12. The control apparatus according to claim 9, wherein said electric-motor control means operates said first electric motor as an electric generator when a differential function of said differential mechanism is not limited.

13. The control apparatus according to claim 9, wherein said electric-motor control means operates said first electric motor and/or said second electric motor as an electric generator when a differential function of said differential mechanism is limited.

14. The control apparatus according to claim 13, wherein the vehicular drive system further includes an electric-energy storage device capable of supplying an electric energy, and wherein said electric-motor control means is configured to supply the electric energy from said electric-energy storage device when said first electric motor and said second electric motor cannot be used as said electric generator.

15. A control apparatus for a vehicular drive system including a differential portion having a differential mechanism operable to distribute an output of an engine to a first electric motor and a power transmitting member, a second electric motor connected to a power transmitting path between the power transmitting member and a first drive wheel of a vehicle, and a differential-state switching device provided in said differential mechanism and operable to selectively switch said differential portion between a differential state in which the differential portion is operable to perform a differential function, and a non-differential state in which the differential portion is not operable to perform the differential function, said control apparatus comprising:
  electric-motor control means for changing a condition of generation of an electric energy depending upon whether a differential function of said differential mechanism is limited during high-speed, high-torque, or high-output running of the vehicle, or not.

16. The control apparatus according to claim 15, wherein the vehicular drive system further includes a third electric motor for driving a second drive wheel of the vehicle different from said drive wheel of said continuously-variable transmission portion, and said electric-motor control means changes the condition of generation of an electric energy to be supplied to said third electric motor, during running of the vehicle with said second drive wheel driven by said third electric motor.

17. The control apparatus according to claim 15, wherein the electric-motor control means changes the condition of generation of said electric energy, by changing an electric generator operated by an output of said engine to generate the electric energy.

18. The control apparatus according to claim 15, wherein said electric-motor control means operates said first electric motor as an electric generator when said differential portion is placed in said differential state.

19. The control apparatus according to claim 15 wherein said electric-motor control means operates said first electric motor and/or said second electric motor as an electric generator when said differential portion is placed in said differential state.

20. The control apparatus according to claim 19, wherein the vehicular drive system further includes an electric-energy storage device capable of supplying an electric energy, and wherein said electric-motor control means is configured to supply the electric energy from said electric-energy storage device when said first electric motor and said second electric motor cannot be used as said electric generator.

21. A control apparatus for a vehicular drive system including a differential portion having a differential mechanism operable to distribute an output of an engine to a first electric motor and a power transmitting member, and a differential limiting device provided in said differential mechanism, and operable to limit a differential function of the differential mechanism, for limiting an operation of the differential mechanism as an electrically controlled continuously variable transmission, said vehicle drive system further including an auxiliary electric motor connected to a power transmitting path between the power transmitting member and a drive wheel of a vehicle, said control apparatus comprising:
  switching control means operated when running of the vehicle with the drive wheel by said auxiliary electric motor is selected, for switching said differential mechanism to a continuously-variable shifting state in which the differential mechanism is operable as an electrically controlled continuously variable transmission; and
  electric-motor control means for changing a condition of generation of an electric energy depending upon whether said differential mechanism is placed in said continuously-variable shifting state or not,
  and wherein said electric-motor control means changes the condition of generation of the electric energy by said first electric motor, which electric energy is supplied to said auxiliary electric motor, during the running of the vehicle with said drive wheel driven by said auxiliary electric motor.

22. The control apparatus according to claim 21, wherein the vehicular drive system further includes an electric-energy storage device capable of supplying an electric energy, and wherein said electric-motor control means is configured to supply the electric energy from said electric-energy storage device when said first electric motor and said auxiliary electric motor cannot be used as said electric generator.

23. The control apparatus according to claim 21, wherein said auxiliary electric motor is operable to drive a second drive wheel of the vehicle, and said switching control means switches said differential mechanism to said continuously-variable shifting state, irrespective of whether a manually operable step-variable-shifting-run selecting member has been operated to select a step-variable shifting state of the differential mechanism or not while the driving of said second drive wheel by said auxiliary electric motor is selected, said differential mechanism being not operable as said electrically controlled continuously-variable transmission.

24. The control apparatus according to claim 21, wherein said auxiliary electric motor is operable to drive a second drive wheel of the vehicle, and said switching control means inhibits switching of said differential mechanism to said continuously-variable shifting state when a torque of the engine is equal to or larger than a predetermined value, even while the driving of said second drive wheel by said auxiliary electric motor is selected.

* * * * *

UNITED STATES PATENT AND TRADEMARK OFFICE
CERTIFICATE OF CORRECTION

| | | |
|---|---|---|
| PATENT NO. | : 7,901,319 B2 | Page 1 of 1 |
| APPLICATION NO. | : 11/993090 | |
| DATED | : March 8, 2011 | |
| INVENTOR(S) | : Atsushi Tabata et al. | |

It is certified that error appears in the above-identified patent and that said Letters Patent is hereby corrected as shown below:

On the title page, Item (54), and column 1, the title is incorrect. Item (54) and column 1 should read:

-- (54) CONTROL APPARATUS FOR VEHICULAR DRIVE SYSTEM --

Signed and Sealed this
Tenth Day of May, 2011

David J. Kappos
*Director of the United States Patent and Trademark Office*